US012438786B2

(12) United States Patent
Chen et al.

(10) Patent No.: US 12,438,786 B2
(45) Date of Patent: Oct. 7, 2025

(54) NETWORK OPTIMIZATION METHOD, SERVER, CLIENT DEVICE, NETWORK SIDE DEVICE, NETWORK DEVICE, SYSTEM AND MEDIUM

(71) Applicant: ZTE CORPORATION, Guangdong (CN)

(72) Inventors: Jiajun Chen, Guangdong (CN); Yin Gao, Guangdong (CN); Zhuang Liu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 423 days.

(21) Appl. No.: 17/927,726

(22) PCT Filed: Mar. 31, 2021

(86) PCT No.: PCT/CN2021/084325
§ 371 (c)(1),
(2) Date: Nov. 24, 2022

(87) PCT Pub. No.: WO2021/238397
PCT Pub. Date: Dec. 2, 2021

(65) Prior Publication Data
US 2023/0216745 A1 Jul. 6, 2023

(30) Foreign Application Priority Data
May 24, 2020 (CN) .......................... 202010445459.8

(51) Int. Cl.
*H04L 41/16* (2022.01)
*G06N 3/098* (2023.01)
(Continued)

(52) U.S. Cl.
CPC .............. *H04L 41/16* (2013.01); *G06N 3/098* (2023.01); *H04W 24/10* (2013.01); *G06N 3/0985* (2023.01)

(58) Field of Classification Search
CPC ........ G06N 3/08; G06N 3/098; G06N 3/0985; G06N 20/00; H04L 41/0823; H04L 41/16; H04W 24/02; H04W 24/08; H04W 24/10
See application file for complete search history.

(56) References Cited

U.S. PATENT DOCUMENTS 10,039,016 B1 * 7/2018 Larish ................... H04W 24/02
2014/0241159 A1 8/2014 Kakadia et al.
(Continued)

FOREIGN PATENT DOCUMENTS

| CN | 109688597 A | 4/2019 |
| CN | 110972180 A | 4/2020 |

(Continued)

OTHER PUBLICATIONS

WIPO, International Search Report issued on Jun. 22, 2021.
(Continued)

*Primary Examiner* — Thomas R Cairns
(74) *Attorney, Agent, or Firm* — Li & Cai Intellectual Property (USA) Office

(57) ABSTRACT

The present application provides a network optimization method, including: sending a session setup request message to a client device to request the client device to perform measurement configuration on a designated network side device and perform measurement configuration on a terminal device connected to the designated network side device; receiving a measurement report message of the designated network side device and a measurement report message of the terminal device; determining, according to pre-acquired (Continued)

machine learning description information, whether to perform collaborative training with the client device; and performing designated model training processing for network optimization based on whether to perform collaborative training with the client device and measurement data in the received measurement report messages, and sending a model training processing result to the client device to instruct the client device to obtain a network optimization action according to the model training processing result.

20 Claims, 6 Drawing Sheets

(51) Int. Cl.
*H04W 24/10* (2009.01)
*G06N 3/0985* (2023.01)

(56) References Cited

U.S. PATENT DOCUMENTS

| | | | |
|---|---|---|---|
| 2015/0193697 A1* | 7/2015 | Vasseur | H04L 47/2466 706/12 |
| 2020/0364561 A1* | 11/2020 | Ananthanarayanan | H04L 63/1425 |
| 2022/0230062 A1* | 7/2022 | Larsson | G06N 3/08 |
| 2023/0083982 A1* | 3/2023 | Xin | H04L 41/16 709/223 |

FOREIGN PATENT DOCUMENTS

| CN | 110972189 A | 4/2020 |
|---|---|---|
| CN | 112512058 A | 3/2021 |
| WO | WO 2020048594 A1 | 3/2020 |

OTHER PUBLICATIONS

European Patent Office, EP21812502.9 Extended European Search Report issued on May 29, 2024.

Qi Sun, China Mobile P.R. China: "New draft Recommendation Y.ML-IMT2020-Data-Handling Framework of data handling to enable machine learning in future networks including IMT-2020", output of Q20/13 meeting, Geneva, Jun. 17-28, 2019 issued on Jun. 27, 2019.

Latif U. Khan, et al: "Federated Learning for Edge Networks: Resource Optimization and Incentive Mechanism", arxiv.org, Cornell University Library, Nov. 6, 2019.

Kai Yang, et al: "Federated Learning via Over-the-Air Computation", arxiv.org, Cornell University Library, Dec. 31, 2018.

* cited by examiner

NETWORK OPTIMIZATION METHOD, SERVER, CLIENT DEVICE, NETWORK SIDE DEVICE, NETWORK DEVICE, SYSTEM AND MEDIUM

CROSS REFERENCE TO RELATED APPLICATIONS

The present application is based on International Application No. PCT/CN2021/084325. filed on Mar. 31, 2021, which is based upon and claims priority to Chinese Patent Application No. 202010445459.8, filed on May 24, 2020, and the entire contents thereof are incorporated herein by reference.

TECHNICAL FIELD

The present application relates to the field of communications, and for example, relates to a network optimization method, a server, a client device, a network side device, a network device, a system, and a medium.

BACKGROUND

The 5th generation wireless systems network is currently under construction, and the beyond 5G (B5G) network is expected to be developed in the future.

For network optimization, no network intelligent optimization solution has proposed yet about configuring an artificial intelligence (AI) function in the communication network to perform an AI-based network intelligent optimization flow.

SUMMARY

The present application provides a network optimization method, a server, a client device, a network side device, a network device, a system, and a medium.

In a first aspect, an embodiment of the present application provides a network optimization method, including: sending a session setup request message to a client device to request the client device to perform measurement configuration on a designated network side device and perform measurement configuration on a terminal device connected to the designated network side device; receiving a measurement report message of the designated network side device and a measurement report message of the terminal device; determining, according to pre-acquired machine learning description information, whether to perform collaborative training with the client device; and performing designated model training processing for network optimization based on whether to perform collaborative training with the client device and measurement data in the received measurement report messages, and sending a model training processing result to the client device to instruct the client device to obtain a network optimization action according to the model training processing result.

In a second aspect, an embodiment of the present application provides a network optimization method, including: performing, in response to receiving a session setup request message from a predetermined server, measurement configuration on a designated network side device and a terminal device connected to the designated network side device according to measurement control information contained in the session setup request message; sending a measurement report message of the designated network side device and a measurement report message of the terminal device to the predetermined server, wherein the measurement report of the designated network side device and the measurement report of the terminal device are used in model training processing for network optimization in the predetermined server; and processing, in response to receiving a model training processing result from the predetermined server, according to the model training processing result to obtain a network optimization action.

In a third aspect, an embodiment of the present application provides a network optimization method, including: performing, in response to receiving a measurement configuration request from a client device, measurement configuration according to network side measurement control information in the measurement configuration request, and performing measurement configuration on a terminal device connected to a current network side device; sending a measurement report of the current network side device obtained from measurement and a received measurement report of the terminal device to a predetermined server and a predetermined client device, respectively, wherein the measurement report of the current network side device and the measurement report of the terminal device are used in the predetermined server and the predetermined client device for model training processing aiming at network optimization.

In a fourth aspect, an embodiment of the present application provides a server, including: a measurement configuration request module configured to send a session setup request message to a client device to request the client device to perform measurement configuration on a designated network side device and perform measurement configuration on a terminal device connected to the designated network side device; a measurement report receiving module configured to receive a measurement report message of the designated network side device and a measurement report message of the terminal device; a collaborative training determining module configured to determine, according to pre-acquired machine learning description information, whether to perform collaborative training with the client device; and a model training processing module configured to perform designated model training processing for network optimization based on whether to perform collaborative training with the client device and measurement data in the received measurement report messages, and send a model training processing result to the client device to instruct the client device to obtain a network optimization action according to the model training processing result.

In a fifth aspect, an embodiment of the present application provides a client device, including: a measurement configuration module configured to perform, in response to receiving a session setup request message from a predetermined server, measurement configuration on a designated network side device and a terminal device connected to the designated network side device according to measurement control information contained in the session setup request message; a measurement report sending module configured to send a measurement report message of the designated network side device and a measurement report message of the terminal device to the predetermined server, wherein the measurement report of the designated network side device and the measurement report of the terminal device are used in model training processing for network optimization in the predetermined server; and an optimization action determining module configured to process, in response to receiving a model training processing result from the predetermined server, according to the model training processing result to obtain a network optimization action.

In a sixth aspect, an embodiment of the present application provides a network side device, including: a measurement configuration module configured to perform, in response to receiving a measurement configuration request from a client device, measurement configuration according to network side measurement control information in the measurement configuration request, and perform measurement configuration on a terminal device connected to a current network side device; and a measurement report sending module configured to send a measurement report the current network side device obtained from measurement and a received measurement report of the terminal device to a predetermined server and a predetermined client device, respectively, wherein the measurement report of the current network side device and the measurement report of the terminal device are used in the predetermined server and the predetermined client device for model training processing aiming at network optimization.

In a seventh aspect, an embodiment of the present application provides a network optimization system, including: a server configured to perform the network optimization method of the first aspect; one or more client devices configured to perform the network optimization method of the second aspect; and one or more network side devices configured to perform the network optimization method of the third aspect.

In an eighth aspect, an embodiment of the present application provides a network device, including: one or more processors; a memory having one or more programs stored thereon which, when executed by the one or more processors, cause the one or more processors to implement any network optimization method according to the embodiments of the present application.

In a ninth aspect, an embodiment of the present application provides a storage medium having a computer program stored thereon which, when executed by a processor, causes any network optimization method according to the embodiments of the present application to be implemented.

According to the network optimization method, the server, the network device and the medium according to the embodiments of the present application, the client device is requested to perform measurement configuration on the network side device and the terminal side device, and according to pre-acquired machine learning description information, it is judged whether to perform collaborative training with the client device, and different kinds of model training processing are performed according to the judgment result. Therefore, a machine learning training process is deployed through the server and the client device to implement distributed model training and processing and to obtain a network optimization action, so that deep analysis is performed on the collected data through artificial intelligence and machine learning in the network system, and a new optimization mode and a new network intelligence optimization flow are provided for network optimization of operators.

According to the network optimization method, the client device, the network device and the medium according to the embodiments of the present application, measurement configuration is performed on the network side device and the terminal side device in response to the session setup request message from the server, and processing is performed in response to the model training processing result from the predetermined server to obtain the network optimization action, and distributed model training processing is implemented with the server based on the model training processing result transmitted with the server to finally obtain the network optimization action. Therefore, data collected by the network side device and the terminal device can be deeply analyzed in machine learning, and a new optimization mode and a new network intelligence optimization flow are provided through the distributed model training for network optimization of operators.

According to the network optimization method, the network side device, the network device and the medium according to the embodiments of the present application, measurement configuration can be performed according to the received network side measurement control information and on the connected terminal device, and the measurement report obtained from the measurement and the received measurement report of the terminal side device can be sent to the predetermined server and client device, and the measurement report of the network side device and the measurement report of the terminal device are used in the predetermined server and the predetermined client device for model training processing aiming at network optimization. Therefore, data collected by the network side device and the terminal device can be deeply analyzed in artificial intelligence and machine learning, and used in the predetermined server and the predetermined client device for distributed model training processing to provide a new optimization mode and a new network intelligence optimization flow for network optimization of operators.

DETAIL DESCRIPTION OF EMBODIMENTS

Embodiments of the present application will be described in detail below with reference to the accompanying drawings. It should be noted that the embodiments of the present application and features therein may be combined with each other in any manner as long as they are not contradictory.

In an embodiment of the present application, while the 5G network brings fundamental changes in performance and flexibility, the complexity of network operation is also notably increased. Therefore, there is an urgent need among operators for an automatic and intelligent means to reduce the cost of network deployment and operation and maintenance, and thus improve the network performance and user experience. Long term evolution (LTE) and the 5G self-organized network (SON) and minimization of drive tests (MDT) play a great role in network optimization, but fail to achieve the goal of a flexible and intelligent network. The 5G network faces the challenge of joint optimization of multiple network key performance indicators (KPIs). Such indicators include, for example, latency, reliability, connection density, user experience, etc.

The conventional network optimization methods gradually exhibit the problems of long reaction period, high error probability, high cost, and the like. The measurement quantity in a radio access network node device and a terminal device can be used for monitoring the network KPI by a network management system on the one hand, and for helping a network manufacturer to optimize radio resource management on the other hand. An embodiment of the present application provides a network optimization scheme in which artificial intelligence/machine learning is adopted for deep analysis of the collected data to provide a new network optimization method for operators, and support an AI-based network intelligent optimization flow in an existing network architecture.

In an embodiment of the present application, a server side device (an AI centralized server) may also be referred to as an AI centralized server or an AI controller having an AI function, and one or more client devices (AI distributed clients) may also be referred to as AI distributed clients having an AI function, where each client device may be arranged on a RAN node device which may include, for example, a network side node device such as a base station.

Figure 1:
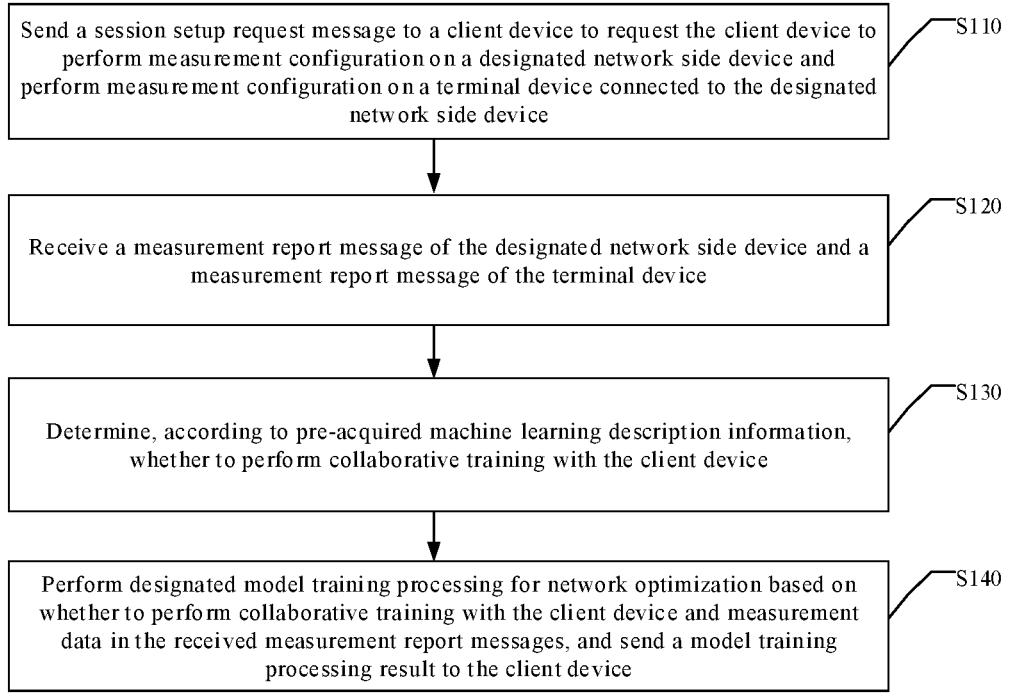
FIG. 1 is a schematic flowchart of a network optimization method according to an embodiment of the present application.

FIG. 1 is a schematic flowchart of a network optimization method according to an embodiment of the present application. As shown in FIG. 1, the network optimization method in the embodiment of the present application may include the following operations S110 to S140.

At S110, sending a session setup request message to a client device to request the client device to perform measurement configuration on a designated network side device and perform measurement configuration on a terminal device connected to the designated network side device.

At S120, receiving a measurement report message of the designated network side device and a measurement report message of the terminal device.

At S130, determining, according to pre-acquired machine learning description information, whether to perform collaborative training with the client device.

At S140, performing designated model training processing for network optimization based on whether to perform collaborative training with the client device and measurement data in the received measurement report messages, and sending a model training processing result to the client device to instruct the client device to obtain a network optimization action according to the model training processing result.

According to the network optimization method in the embodiment of present application, the client device is requested to perform measurement configuration on the network side device and the terminal side device, and according to pre-acquired machine learning description information, it is judged whether to perform collaborative training with the client device, and different kinds of model training processing are performed according to the judgment result. Therefore, a machine learning training process is deployed through the server and the client device to implement distributed model training and processing and to obtain a network optimization action, so that deep analysis is performed on the collected data through artificial intelligence and machine learning in the network system, and a new optimization mode and a new network intelligence optimization flow are provided for network optimization of operators.

In an embodiment, before S110, the network optimization method further includes: activating a machine learning function in response to receiving a first activation message, and acquiring machine learning description information and training hyper-parameters of a corresponding machine learning model carried in the activation message.

In this embodiment, a network operation administration and maintenance (OAM) system or a core network sends a machine learning activation message through an interface of the AI centralized server to instruct the AI centralized server to activate or use a machine learning (ML) function. The AI centralized server or AI control node may be located inside or outside the core network.

Illustratively, the activation message includes an indication about whether the ML function is activated; ML description information; training hyper-parameters of the corresponding ML model, such as a learning rate, a number of epochs, a batchsize, and the like.

In an embodiment, the ML description message contains one or more of: one or more selected ML types, such as supervised learning, unsupervised learning, reinforcement learning, deep learning, or transfer learning, one or more selected ML models, such as a convolutional neural network (CNN), a recurrent neural network (RNN), a long short-term memory (LSTM) network, a support vector machine (SVM), an autoregressive moving average model (ARIMA), or a decision tree.

In this embodiment, the OAM or core network may activate the AI function of the AI centralized server, and control the ML algorithm and the ML model used for model training of the AI centralized server through the ML description information, and determine whether to perform collaborative model training in cooperation with the AI distributed client by the AI centralized server through the ML algorithm and the ML model used for model training of the AI centralized server.

In an embodiment, the session setup request message may include measurement control information for the client device, a computation processing capacity information item of the client device, and one or more machine learning models desired to be supported by the client device. The measurement configuration information is configured to indicate a measurement quantity and a measurement reporting mode to be configured for the designated network side device.

In this embodiment, the AI centralized server sends an ML session setup request message to the AI distributed clients in one or more base stations, to configure radio-side measurement data desired for a certain ML session.

In an embodiment, the session request message may include measurement control information configured to instruct the measurement to be performed by the AI distributed client and how to report. The AI computation processing capacity of the distributed client may include, for example, a memory size of a central processing unit (CPU), a display memory size of a graphics processing unit (GPU), a CPU/GPU resource utilization rate in a current state, and the like in the AI distributed client. Then, the distributed client is instructed to report one or more supportable ML models.

In an embodiment, the session request message may further include an ML session ID configured to uniquely identify a certain machine learning session process. If the session request message does not contain any ML session ID, it indicates that the measurement control in the request message is for all ML processes. In other words, the measurement quantity to be collected and the measurement reporting mode may be indicated for all machine learning processes.

In an embodiment of the present application, the machine learning process (or called machine learning session) may be configured to indicate machine learning corresponding to the measurement control information carried in the session setup request. Illustratively, the machine learning process may be determined according to different optimization indicators. For example, different optimization indicators are set for different communication quality indicators, and the different optimization indicators correspond to different machine learning processes. Alternatively, the machine learning process may be determined by a machine learning type, including, but not limited to, any one of supervised learning, unsupervised learning, reinforcement learning, deep learning, or transfer learning. Alternatively, the machine learning process may be determined by a machine learning model, including, but not limited to, any one of a convolutional neural network, a recurrent neural network, a long short-term memory network, a support vector machine, an autoregressive moving average model, or a decision tree.

In an embodiment, after S110, the network optimization method further includes: determining, in response to the received session setup response message and according to a succeed ID carried in the session setup response message, that the client device is capable of meeting requirement information on the computation processing capacity of the client device.

In this embodiment, with the session setup response message, it may be determined whether the measurement configuration on the network side client and the terminal device is successful, and whether the client device satisfies one or more ML models supported by the client and desired in the session setup request.

Illustratively, if the measurement configuration at the base station side and at the terminal side are both successful, and the client device at the base station can satisfy an ML model in the setup request message, the base station sends an ML session setup response message carrying a success indication to the AI centralized server. If the measurement configuration at the base station side or at the UE side fails, or the ML model in the setup request message cannot be satisfied, the base station sends an ML session setup response message carrying a failure indication to the AI centralized server. Optionally, the message further carries an ML session ID. Illustratively, the ML session setup response message may carry an ML session ID.

In an embodiment, S120 may specifically include: receiving a measurement report of the designated network side device and a measurement report of the terminal device sent from the designated network side device.

In this embodiment, the AI centralized server is not directly connected to the terminal device. Instead, after the terminal device reports the measurement report to the network side device, the network side device sends the measurement report of the terminal device to the AI server, where the AI server may obtain the measurement report of the terminal device through a communication interface between network side devices.

In an embodiment, the machine learning description information includes one or more selected machine learning types and one or more selected machine learning models. S130 may specifically include operations S131 to S132. At S131, acquiring, according to a selected machine learning type and a selected machine learning model, a predetermined training mode corresponding to the machine learning type and the machine learning model. At S132, determining, according to a predetermined training mode, whether to perform collaborative training with the client device.

In this embodiment, through the ML description information, the ML algorithm and the ML model used for model training of the AI centralized server are controlled, and whether to perform collaborative model training with the AI distributed client is determined. Illustratively, a first correspondence relationship of some selected ML algorithms and ML models with not performing collaborative model training with the AI distributed client, and a second correspondence relationship of some other selected ML algorithms and ML models with performing collaborative model training with the AI distributed client, can be predetermined. Therefore, according to the first correspondence relationship and the second correspondence relationship, as well as the selected ML algorithm and ML model, whether to perform collaborative model training with the AI distributed client is determined. When it is determined not to perform collaborative model training with the AI distributed client, the AI distributed client may perform model training processing such as ML model derivation and execution.

In an embodiment, when it is determined not to perform collaborative training with the client device, the model training processing result includes the trained machine learning model and model parameter values. S140 may specifically include the following operations S11 to S13.

At S11, acquiring the computation processing capacity of the client device from the received measurement report of the designated network side device. The client device is deployed in the designated network side device.

At S12, selecting, according to the received measurement data, the computation processing capacity of the client device and a pre-acquired machine learning model supported by the client device, a machine learning algorithm for model training to obtain the trained machine learning model and model parameter values.

At S13, sending a first model deployment message to the client device to generate a first network optimization action instruction at the client device. The first model deployment message includes: a first model derivation configuration file, the trained machine learning model and model parameter values, a first model performance reporting indication, and a first model performance reporting mode.

In an embodiment of the present application, a model deployment message (ML deployment message) is sent to distributed clients in one or more base stations, so as to send an ML model derivation (or execution) configuration file.

Illustratively, the model derivation configuration file may contain one or more of: a GPU display memory usage size, an input data size, an output data size, and the like.

Illustratively, the trained ML model and ML model parameter values may contain one or more of: an ML model graph, trained weights in the ML model, trained biases in the ML model, and the like.

Illustratively, the model performance reporting indication information contains one or more of: a mean square error (MSE), a mean absolute error (MAE), and accuracy; and a model performance reporting mode, such as event reporting or periodic reporting.

In this embodiment, when it is determined not to perform collaborative training with the client device, the AI centralized server selects, according to the measurement data, and the computation processing capacity and the supported ML model of the AI distributed client, a suitable ML algorithm for model training and model iterative update. Then, the trained machine learning model and model parameter values obtained through the model training are sent to the distributed client so that the distributed client can perform model processing such as model update, model inference, model instruction and the like according to the received machine learning model and model parameter values, thereby obtaining an optimization action instruction at the distributed client.

In this embodiment, the AI server may notify the network side device to perform a relevant optimization action through a network operation request message (RAN action request). The optimization action may be one or more action indications and parameters desired for the corresponding actions, for example, including but not limited to: a user equipment switch instruction, a cell close/open instruction, a radio resource activate/deactivate instruction, a power adjust instruction, a radio resource management (RRM) parameter reconfigure instruction, an offloading instruction, a protocol layer parameter reconfigure instruction, and the like.

During the model training process, the AI centralized server does not directly generate an optimization action instruction, but sends the trained model and model parameters to the distributed client, where the distributed client can perform targeted model training according to the measurement data in the measurement report received by the distributed client itself, to obtain an optimization action more suitable for the current distributed client.

In an embodiment, after S13, the network optimization method further includes operations S14 or S15. At S14, determining, in response to receiving a first model deployment response message from the client device and according to a first model deployment succeed ID in the first model deployment response message, that the trained machine learning model is successfully deployed at the client device. At S15, determining, according to the first model deployment fail ID in the first model deployment response message, that the trained machine learning model fails to be deployed at the client device.

In this embodiment, a network side device (e.g., a base station) sends an ML model deployment response message. If the ML model deployment configuration is successful, the base station sends an ML model deployment response message carrying a success indication to the AI centralized server. Optionally, the message further carries an ML session ID. If the ML model deployment configuration fails, the base station may send an ML model deployment response message carrying a failure indication to the AI centralized server. Optionally, the message further carries an ML session ID.

In an embodiment, after S13, the network optimization method further includes operation S16. At S16, determining, in response to receiving a first model performance report message from the network side device and according to a model performance indicator value carried in the first model performance report message, whether to perform model training processing again.

In an embodiment of the present application, the model performance indicator includes, but is not limited to, a network KPI and network energy saving performance, such as a mean square error (MSE), a mean absolute error (MAE), accuracy, or the like. The model performance reporting mode may be, for example, event reporting or periodic reporting or other reporting modes. This is not particularly limited in the embodiments of present application.

In this embodiment, the AI centralized server determines whether to retrain the deployed network according to the model performance report message reported by the network side device.

In an embodiment, when it is determined to perform collaborative training with the client device, S140 may specifically include the following operations S21 to S25.

At S21, acquiring the computation processing capacity reported by the client device from the received measurement report of the designated network side device. The client device is deployed in the designated network side device. At S22, selecting a machine learning algorithm and configuring training hyper-parameter values according to the received measurement data, the pre-acquired computation processing capacity of the client device, and a machine learning model supported by the client device; At S23, sending a model configuration message to the client device to request the client device to perform model configuration according to the machine learning algorithm and the training hyper-parameter values. At S24, receiving a model configuration message from the client device. The model configuration message includes machine learning model information obtained through model configuration and model training for the machine learning algorithm and the training hyper-parameter values by the client device. At S25, performing model configuration and model training processing based on the trained machine learning model information to obtain the model training processing result, and sending the model training processing result to the client device.

In this embodiment, through S21 to S24, the AI centralized server selects, according to the measurement data, and the AI computation processing capacity and the supported ML model of the AI distributed client, a suitable ML algorithm, configures training hyper-parameter values, and sends an ML model configuration message to AI distributed clients in one or more base stations through the AI centralized server to send the selected ML model and ML training hyper-parameters.

In an embodiment, the machine learning model information may include, for example, trained weights in the ML model, trained biases in the ML model, and the like. Optionally, the message contains an ML session ID configured to uniquely identify an ID of a certain process.

Optionally, the ML model configuration message or model configuration message contains an ML session ID configured to uniquely identify an ID of a certain process.

In an embodiment, the model training processing result includes a second network optimization action instruction. S25 may specifically include operations S2501 to S2502. At S2501, further performing model training according to the received measurement data and the trained machine learning model information to obtain a second network optimization action instruction. At S2502, sending a second network operation request message to the network side device. The second network operation request message includes a second network optimization action instruction, a second model performance reporting indication, and a second model performance reporting mode.

In this embodiment, the AI centralized server further performs model training according to the trained machine learning model information to obtain a network optimization action instruction. After S2502, the network optimization method further includes operation S2503. At S2503, determining, in response to receiving a second model performance report message from the network side device and according to a model performance indicator value carried in the second model performance report message, whether to perform model training processing again.

In this embodiment, the second model performance report message optionally carries an ML session ID. With the model performance indicator value in the second model performance report message, whether to perform model training processing again is determined, and thus the performance indicator to be satisfied by the network side is obtained through the model training processing.

In an embodiment, the model training processing result includes the further trained machine learning model and model parameter values; and S25 may specifically include operations S2511 to S2512. At S2511, further performing model training according to the received measurement data and the machine learning model information to obtain the further trained machine learning model and model parameter values. At S2512, sending a second model deployment message to the client device to generate a third network optimization action instruction at the client device. The second model deployment message includes: a second model derivation configuration file, the further trained machine learning model and model parameter values, a second model performance reporting indication, and a second model performance reporting mode.

In this embodiment, the AI server further performs model training according to the trained model and parameters of the AI distributed client to obtain the further trained machine learning model and model parameter values, and sends the further trained machine learning model and model parameter values to the AI distributed client so that the AI distributed client performs model deployment and model instruction according to the further trained machine learning model and model parameter values to obtain a network optimization instruction.

In an embodiment, after S2512, the network optimization method further includes operations S2513 or S2514. At S2513, determining, in response to receiving a second model deployment response message from the client device and according to a second model deployment succeed ID carried in the second model deployment response message, that the further trained machine learning model is successfully deployed at the client device. At S2514, determining, according to the second model deployment fail ID carried in the second model deployment response message, that the further trained machine learning model fails to be deployed at the client device.

In this embodiment, the second model deployment response message optionally contains an ML session ID configured to uniquely identify an ID of a certain process.

In an embodiment, after S2512, the network optimization method further includes operation S2515. At S2515, determining, in response to receiving a second model performance report message from the network side device and according to a model performance indicator value carried in the second model performance report message, whether to perform model training processing again.

In this embodiment, the second model performance report message optionally contains an ML session ID configured to uniquely identify an ID of a certain process.

In an embodiment, a current server communicates with the designated network side device and the client device located in the designated network side device through a predetermined interface. Before S110, the network optimization method may further include operations S31 to S32. At S31, establishing, in response to the received control plane interface setup request message, a control plane interface between the current server and the designated network side device as the predetermined interface. At S32, sending a control plane interface setup response message to the designated network side device to indicate that the predetermined interface is successfully established.

In an embodiment, if the control plane interface setup request message includes data plane channel information of the designated network side device, a data plane channel address of the current server is carried in the control plane interface setup response message while performing S32, i.e., sending the control plane interface setup response message to the designated network side device.

In this embodiment, the address of the AI centralized server is transmitted to the network side device by establishing a control plane interface, and the network side device where the client is located may communicate with other network side devices through existing communication transmission interfaces between the network side devices.

According to the network optimization method described in the above embodiment, the AI centralized server may judge, according to the pre-acquired machine learning description information, whether to perform collaborative training with the client device, and perform different kinds of model training processing according to the judgment result. Therefore, a machine learning training process is deployed through the server and the client device to implement distributed model training and processing and to obtain a network optimization action, and a new optimization mode and a new network intelligence optimization flow are provided for network optimization of operators.

Figure 2:
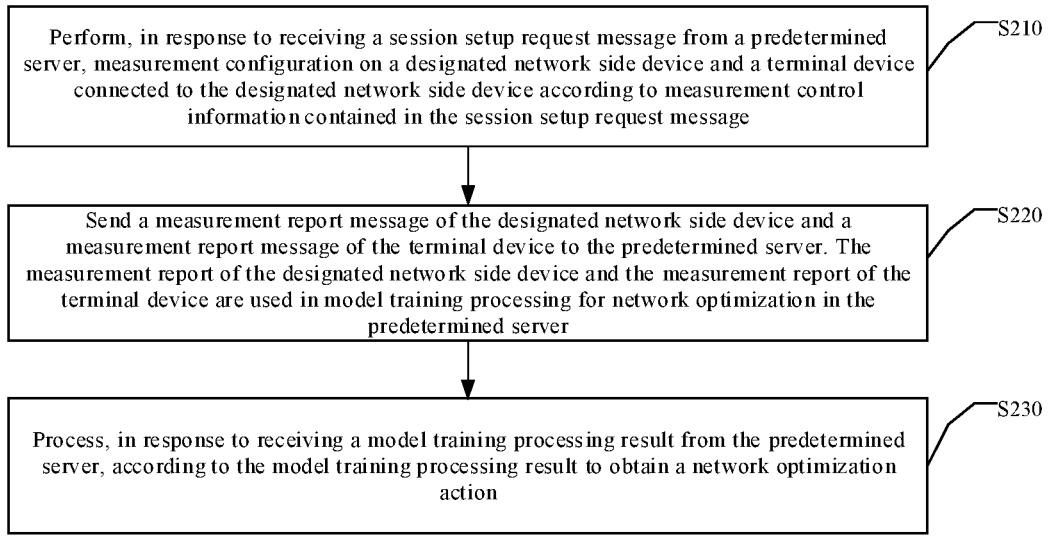
FIG. 2 is a schematic flowchart of a network optimization method according to another embodiment of the present application.

FIG. 2 is a schematic flowchart of a network optimization method according to another embodiment of the present application. As shown in FIG. 2, the network optimization method in the embodiment of the present application may include the following operations S210 to S230.

At S210, performing, in response to receiving a session setup request message from a predetermined server, measurement configuration on a designated network side device and a terminal device connected to the designated network side device according to measurement control information contained in the session setup request message.

At S220, sending a measurement report message of the designated network side device and a measurement report message of the terminal device to the predetermined server. The measurement report of the designated network side device and the measurement report of the terminal device are used in model training processing for network optimization in the predetermined server.

At S230, processing, in response to receiving a model training processing result from the predetermined server, according to the model training processing result to obtain a network optimization action.

In this embodiment, the client device, such as an AI distributed client, performs measurement configuration on the network side device and the terminal side device in response to the session setup request message from the server, and performs processing in response to the model training processing result from the predetermined server to obtain a network optimization action, and implements distributed model training processing with the server based on the model training processing result transmitted with the server to finally obtain the network optimization action. Therefore, data collected by the network side device and the terminal device can be deeply analyzed in machine learning, and a new optimization mode and a new network intelligence optimization flow are provided through the distributed model training for network optimization of operators.

In an embodiment, S210 may include operations S211 and S212. At S211, performing, in response to the session setup request message, measurement configuration on a network side device where a current client device is located according to network side measurement control information. At S212, sending a measurement configuration request to a network side device not deployed with the current client device to request the network side device not deployed with the current client device to perform measurement configuration according to the network side measurement control information.

In an embodiment, the session setup request message further includes one or more machine learning models desired to be supported by the client device. After S210, the network optimization method further includes: sending, if the measurement configuration of the network side device and the terminal device is successful and the current client device supports the machine learning model, a session setup response message carrying a configuration succeed ID to the predetermined server; and sending, if the measurement configuration of the network side device or the terminal device fails, or the current client device does not support the machine learning model, a session setup response message carrying a configuration fail ID to the predetermined server.

In this embodiment, if the measurement configuration is successful and the machine learning model is supported, a measurement configuration succeed message is fed back to the AI centralized server, and if the measurement configuration fails and the machine learning model is not supported, a measurement configuration fail message is fed back to the AI centralized server. Failure of measurement configuration includes failure of network side device measurement configuration or failure of terminal device measurement. Optionally, the session setup response message carries an AI session ID.

In an embodiment, the session setup request message further includes a computation processing capacity information item. In execution of S220, carrying, in a measurement report of a network side device where a current client device is located, a computation processing capacity of the current client device.

In this embodiment, the AI distributed client feeds back the AI computation processing capacity of the current client device to the AI centralized server through the session setup request message. Optionally, the session setup request message carries an AI session ID.

In an embodiment, before S210, the network optimization method further includes: activating a machine learning function in response to receiving a second activation message, and acquiring machine learning description information and policy information to be satisfied by the network, carried in the second activation message.

In this embodiment, the OAM or core network of the network management system sends an ML activation message through an interface with the base station to instruct the AI distributed client to activate (use) the ML function. The message contains an indication about whether the ML function is activated; and an ML description message; and the message contains policy information to be satisfied by the RAN network side device. The ML description message in the AI distributed client is substantially the same as the ML description message in the AI centralized server in the above embodiment, and the ML description message in the AI distributed client may be configured for selecting the suitable ML type and ML model when model training is performed on the AI distributed client.

In an embodiment, the policy information to be satisfied by the network contains one or more of the following object identity information: one or more user equipment identities (UE IDs), one or more QOS flow identities (QFIs), one or more cell identities, one or more network slice identities, one or more public land mobile network identities (PLMN IDs), one or more private network identities, one or more base station identities, and one or more tracking area code identities (TAC IDs).

In this embodiment, if the entity identified by the object identity information includes one or more terminal devices, the designated network side device for measurement may be a network side device to which the identified one or more terminal devices are connected; and if the entity identified by the object identity information includes at least one of one or more QFIs, one or more cells, one or more network slices, one or more public networks, or one or more private networks, the network side device for measurement may be a network side device involved in the communication range of the identified entity.

In this embodiment, the network side device for measurement may be flexibly selected according to the requirement of actual machine learning, which is not particularly limited in the embodiments of present application.

In an embodiment, the communication quality indicator information may be configured to indicate the communication quality desired to be achieved by the entity identified by the corresponding object identity information. Illustratively, the communication quality indicator information may include one or more of: a network energy saving indicator, a network KPI, a quality of service (QoS) indicator, a quality of experience (QOE) indicator, a key quality indicator (KQI), and traffic steering preferences.

Illustratively, the network energy saving indicator may include, for example: one or more of an energy-saving efficiency, an energy consumption percentage indicator, and an energy saving value. As an example, the network KPI may include, for example: one or more of a switching success rate, a call drop rate, an access success rate, a user throughput rate, a cell throughput rate, a cell load, a network load, a radio resource utilization rate and a network coverage rate. As an example, the QoS indicator may include, for example: one or more of a service guaranteed rate, a service maximum/minimum rate, a service delay, a service priority, a delay jitter, and a packet loss rate. As an example, the ODE indicator may include, for example: one or more of a mean opinion score (MOS) for measuring a voice quality of the communication system, a streaming media opening cache time, a streaming media re-caching time, and a number of streaming media re-caches.

In an embodiment, the model training processing result is a trained machine learning model. S230 may specifically include operation S231. At S231, deploying and executing, in response to receiving a first model deployment message from the predetermined server and according to a model derivation configuration file, the trained machine learning model and model parameter values in the first model deployment message, the trained machine learning model to obtain a first network optimization action instruction.

In this embodiment, the AI distributed client is merely used for ML model derivation and execution, and deploys and executes the trained machine learning model according to the received trained model and parameters of the AI centralized server to obtain a network optimization action instruction.

In an embodiment, after S231, the network optimization method further includes operations S232 to S233. At S232, sending, if the trained machine learning model is successfully deployed, a first model deployment response message carrying a first model deployment succeed ID to the predetermined server. At S233, sending, if the trained machine learning model fails to be deployed, a first model deployment response message carrying a first model deployment fail ID to the predetermined server.

In this embodiment, when deploying, the AI distributed client may return the model deployment result to the AI centralized server according to the received trained model and parameters of the AI centralized server.

In an embodiment, the model deployment message further includes a first model performance reporting indication, and a first model performance reporting mode. After S231, the network optimization method further includes operations S234 to S236. At S234, executing the first network optimization action instruction at a network side device where a current client device is located. At S235, generating a first network optimization action request to request a network side device not deployed with the current client device to designate the first network optimization action instruction. At S236, sending, according to the first model performance reporting mode, a first model performance report message to the predetermined server. A corresponding model performance indicator value is carried in the first model performance report message.

In this embodiment, the first network optimization action request optionally carries a session ID configured to uniquely identify an ID of a certain process. The AI distributed client may execute the first network optimization action instruction at a network side device where the client is located, and send the model performance indicator to the AI centralized server.

In an embodiment, S230 may specifically include operations S41 to S44.

At S41, performing, in response to receiving a model configuration message from the predetermined server, model configuration and hyper-parameter configuration according to a machine learning algorithm and training hyper-parameter values in the model configuration message. At S42, performing, if model configuration and hyper-parameter configuration are successful, machine learning model training according to the configured model and hyper-parameters to obtain trained machine learning model information; At S43, sending a distributed training request message to the predetermined server. The distributed training request message contains the trained machine learning model information. At S44, obtaining, in response to receiving a model training processing result for the trained machine learning model information from the predetermined server, a network optimization action according to the model training processing result.

In this embodiment, the AI distributed client and the AI centralized server perform collaborative training, in which in response to receiving a model training processing result for the trained machine learning model information from the predetermined server, a network optimization action may be obtained according to the model training processing result.

In an embodiment, the model training processing result includes a second network optimization action instruction. S44 may specifically include: obtaining, in response to receiving a second network optimization action request from the predetermined server, the second network optimization action instruction carried in the second network optimization action request.

In this embodiment, a method for performing distributed training on the AI distributed client and the AI centralized server is provided, in which after the AI distributed client sends the trained machine learning model information to the AI centralized server, the AI centralized server performs further training on the trained machine learning model information reported by each AI distributed client, to obtain a network optimization action.

In an embodiment, the second network optimization action request further includes a second model performance reporting indication, and a second model performance reporting mode. After S44, the network optimization method further includes operations S441 to S443. At S441, executing the second network optimization action instruction at a network side device where a current client device is located. At S442, generating a second network operation request message to request a network side device not deployed with the current client device to designate the second network optimization action instruction. At S443, sending, according to the second model performance reporting mode, a second model performance report message to the predetermined server. A second model performance indicator value is carried in the second model performance report message.

In this embodiment, the network side device where the AI distributed client is located is desired to report the model performance indicator to the second network optimization action instruction.

In an embodiment, the model training processing result includes the further trained machine learning model and model parameter values. S44 may specifically include operation S444. At S444, deploying and executing, in response to receiving a second model deployment message and according to a model derivation configuration file, the further trained machine learning model and model parameter values in the second model deployment message, the further trained machine learning model to obtain a third network optimization action instruction.

In this embodiment, another method for performing distributed training on the AI distributed client and the AI centralized server is provided, in which after the AI distributed client sends the trained machine learning model information to the AI centralized server, the AI centralized server performs further training on the trained machine learning model information reported by each AI distributed client, to obtain the further trained machine learning model information, and the AI distributed clients perform model training processing according to the further trained machine learning model information to obtain a network optimization action.

In an embodiment, after S444, the network optimization method further includes: sending, if the further trained machine learning model is successfully deployed, a second model deployment response message carrying a second model deployment succeed ID to the predetermined server; and sending, if the further trained machine learning model fails to be deployed, a second model deployment response message carrying a second model deployment fail ID to the predetermined server.

In this embodiment, the second model deployment response message is configured to feed back the model deployment result, and optionally carries a session ID configured to uniquely identify a certain machine learning session process. If the session request message does not contain any ML session ID, it indicates that the measurement control in the request message is for all ML processes.

In an embodiment, the second model deployment message further includes a second model performance reporting indication, and a second model performance reporting mode. After S444, the network optimization method further includes operations S445 to S447. At S445, executing the third network optimization action instruction at a network side device where a current client device is located. At S446, generating a third network optimization action request to request a network side device not deployed with the current client device to execute the third network optimization action instruction. At S447, sending, according to the second model performance reporting mode, a second model performance report message to the predetermined server. A corresponding model performance indicator value is carried in the second model performance report message.

In this embodiment, the third network optimization action instruction optionally carries a session ID, and the AI distributed client executes the network optimization action instruction at the network side device where the current client device is located, so that a corresponding model performance report message can be fed back to the AI centralized server.

According to the network optimization method in the embodiment of present application, the AI distributed client performs measurement configuration on the network side device and the terminal side device in response to the session setup request message from the server, and performs processing in response to the model training processing result from the predetermined server to obtain a network optimization action, implements distributed model training processing with the server based on the model training processing result transmitted with the server to finally obtain the network optimization action. Therefore, data collected by the network side device and the terminal device can be deeply analyzed in machine learning, and a new optimization mode and a new network intelligence optimization flow are provided through the distributed model training for network optimization of operators.

Figure 3:
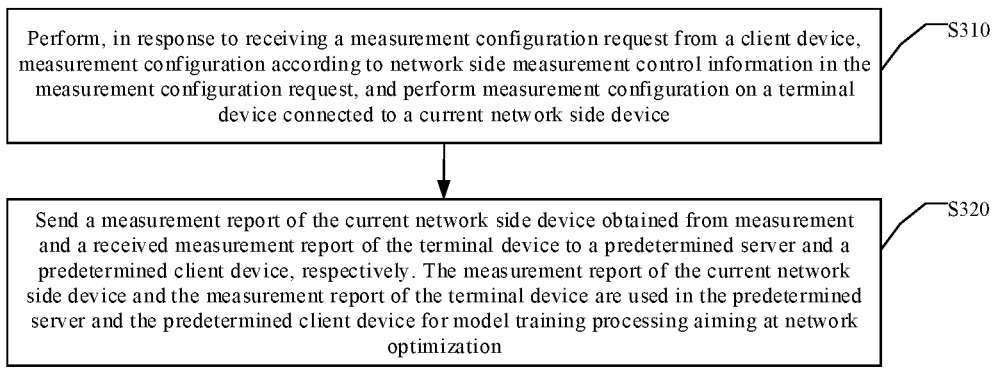
FIG. 3 is a schematic flowchart of a network optimization method according to still another embodiment of the present application.

FIG. 3 is a schematic flowchart of a network optimization method according to still another embodiment of the present application. As shown in FIG. 3, in an embodiment, the network optimization method includes the following operations S310 to S320.

At S310, performing, in response to receiving a measurement configuration request from a client device, measurement configuration according to network side measurement control information in the measurement configuration request, and performing measurement configuration on a terminal device connected to a current network side device.

At S320, sending a measurement report of the current network side device obtained from measurement and a received measurement report of the terminal device to a predetermined server and a predetermined client device, respectively. The measurement report of the current network side device and the measurement report of the terminal device are used in the predetermined server and the predetermined client device for model training processing aiming at network optimization.

In this embodiment, the RAN network side device may perform measurement configuration according to the received network side measurement control information and on the connected terminal device, and send the measurement report obtained from the measurement and the received measurement report of the terminal side device to the predetermined server and client device. The measurement report of the network side device and the measurement report of the terminal device are used in the predetermined server and the predetermined client device for model training processing aiming at network optimization. Therefore, data collected by the network side device and the terminal device can be deeply analyzed in artificial intelligence and machine learning, and used in the predetermined server and the predetermined client device for distributed model training processing to provide a new optimization mode and a new network intelligence optimization flow for network optimization of operators.

In an embodiment, S310 may specifically include operations S311 to S313. At S311, performing, in response to receiving the measurement configuration request, measurement configuration according to the network side measurement control information. At S312, determining, according to the network side measurement control information, a measurement quantity and a measurement reporting mode to be configured for the terminal device connected to the current network side device as terminal side measurement control information. At S313, sending a radio resource control message to the terminal device to instruct the terminal device to perform measurement configuration according to the terminal side measurement control information.

In this embodiment, the RAN network side device may perform measurement configuration according to the network side measurement control information and perform measurement configuration on the connected terminal device.

In an embodiment, after S320, the network optimization method further includes operation S330. At S330, receiving a network optimization action request from the predetermined server or the client device, acquiring and executing a network optimization action instruction in the received network optimization action request, and sending a corresponding model performance report message to the predetermined server.

In this embodiment, to execute the network optimization action instruction, the RAN network side device is desired to send a corresponding model performance report message to the predetermined server.

In an embodiment, the network side device communicates with the predetermined server through a predetermined interface, and before S310, the network optimization method further includes operation S51. At S51, sending, according to a pre-acquired address of the predetermined server, a control plane interface setup request message to the predetermined server to request the predetermined server to establish a control plane interface between the current network side device and the predetermined server as the predetermined interface.

In an embodiment, the control plane interface setup request message includes one or more of: measurement supported by the current network side device, a reporting mode supported by the current network side device, a network optimization action supported by the current network side device and a data plane channel address of the current network side device, a computing capacity supported by the deployed client device and a machine learning model supported by the deployed client device.

In an embodiment, the network optimization method further includes operation S340. At S340, determining, in response to the received control plane interface setup response message, that a control plane interface is successfully established between the current network side device and the predetermined server. If the control plane interface setup request message includes the data plane channel address of the current network side device, the received control plane interface setup response message includes the data plane channel address of the predetermined server.

In this embodiment, a communication interface is established between an RAN node device and the AI centralized server, through which measurement configuration is performed according to the received network side measurement control information and on the connected terminal device. Further, the measurement report obtained from the measurement and the received measurement report of the terminal side device are sent to the predetermined server and client device. The measurement report of the network side device and the measurement report of the terminal device are used in the predetermined server and the predetermined client device for model training processing aiming at network optimization. Therefore, data collected by the network side device and the terminal device can be deeply analyzed in artificial intelligence and machine learning, and used in the predetermined server and the predetermined client device for distributed model training processing to provide a new optimization mode and a new network intelligence optimization flow for network optimization of operators.

Figure 4:
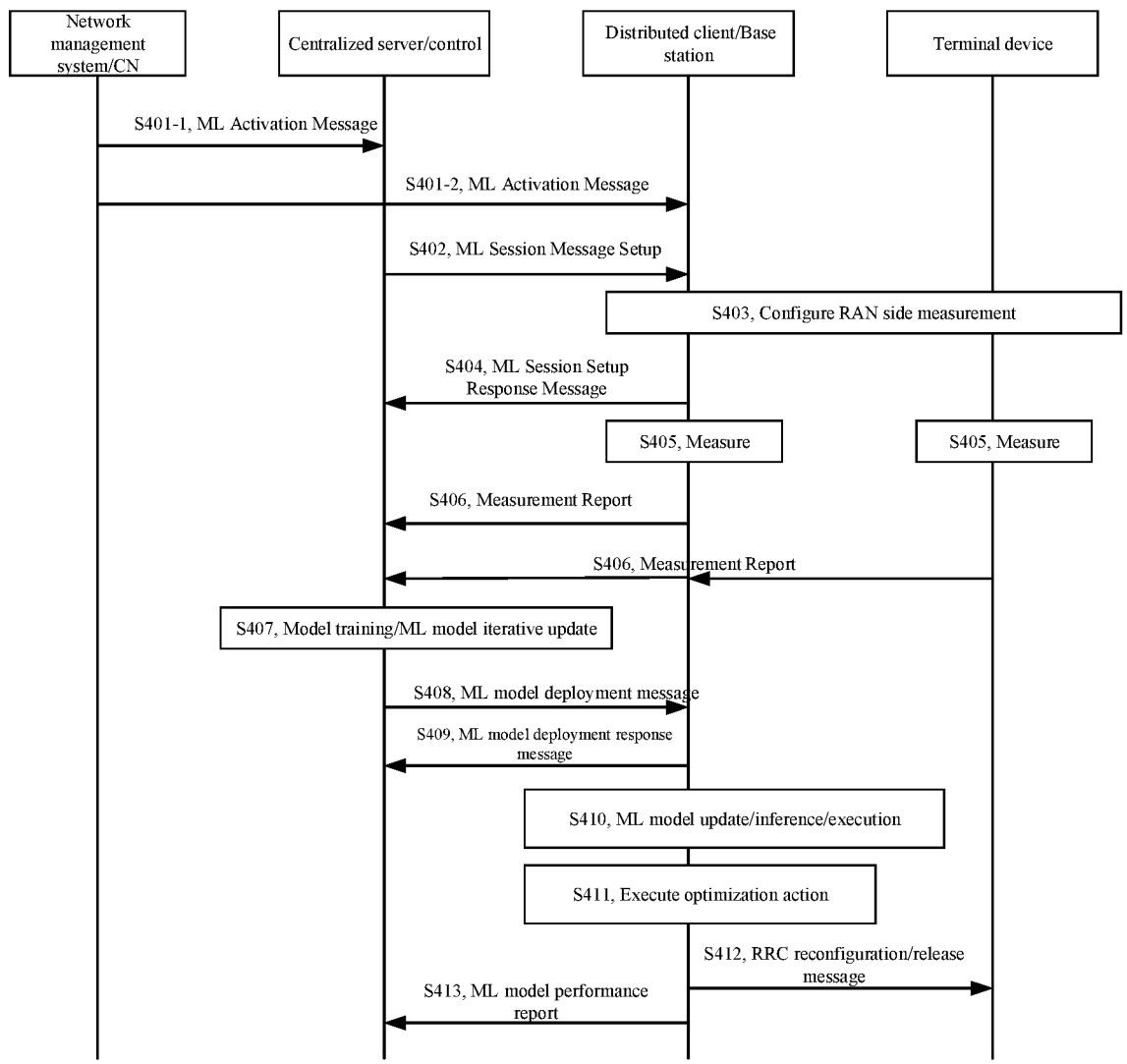
FIG. 4 is a timing flow diagram illustrating a network optimization method according to an embodiment of the present application.
Figure 5:
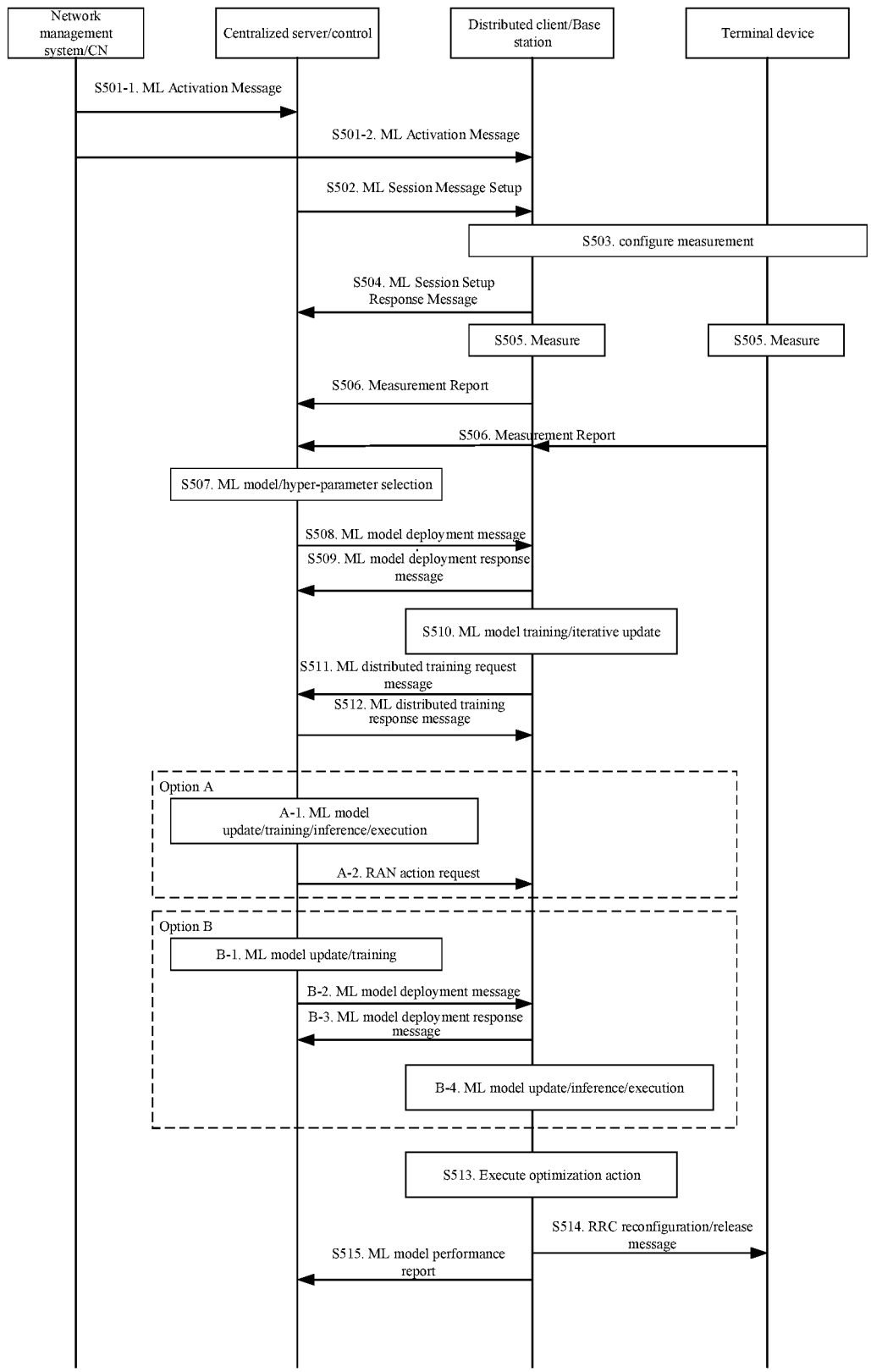
FIG. 5 is a timing flow diagram illustrating a network optimization method according to another embodiment of the present application.

For better understanding of the present application, the network optimization method according to the embodiments of the present application is described in detail below with reference to FIGS. 4 and 5. FIG. 4 is a timing flow diagram illustrating a network optimization method according to an embodiment. FIG. 5 is a timing flow diagram illustrating a network optimization method according to another embodiment.

As shown in FIG. 4, in an embodiment, the network optimization method may include the following operations S401-1 to S403.

At S401-1: the network management system or the core network sends an activation message to activate an ML function of the AI centralized server.

At S401-2: the network management system or the core network sends an activation message to activate an ML function of the AI distributed client.

At S402: the AI centralized server sends an ML session setup request message to the AI distributed clients in one or more RAN node devices to configure radio-side measurement data desired for a certain ML session.

The ML session setup request message includes measurement control information, a computation processing capacity information item of the client device, and one or more machine learning models desired to be supported by the client device. The session setup request message may further include an ML session ID configured to uniquely identify a certain machine learning process.

At S403: the RAN node device configures, according to the measurement control information in the received message, measurement to be performed at the RAN side and a reporting mode thereof, and measurement to be performed by the connected terminal device and a reporting mode thereof.

At S404: if the measurement configuration at the RAN node device side and at the UE side are both successful, and the ML model in the setup request message can be satisfied, the RAN node device sends an ML session setup response message to the AI centralized server.

Optionally, the ML session setup response message carries an ML session ID.

At S405: if the measurement configuration at the RAN node device side and at the UE side are both successful, the RAN node device and the UE both perform related measurement according to the designated measurement configuration.

At S406, the RAN node device and a terminal send a measurement report message to the AI distributed client and the AI centralized server, respectively.

The sent measurement report message carries a measurement value of the measurement quantity, and optionally carries an ID of the ML session to which the measurement belongs, and an AI computation processing capacity of the AI distributed client.

At S407: the AI centralized server selects, according to the measurement data, and the AI computation processing capacity and the supported ML model of the AI distributed client, a suitable ML algorithm for model training and model iterative update.

At S408: the AI centralized server sends an ML model deployment message to the AI distributed clients in one or more RAN node devices. Optionally, the ML model deployment message carries an ML session ID.

At S409: the RAN node device sends an ML model deployment response message.

The ML model deployment response message may carry an ML session ID.

At S410: the AI distributed client performs model processing such as ML model inference, model update, model execution and the like according to a configuration file in the ML model deployment message, and the trained ML model and ML model parameter values, to obtain an RAN action desired for optimization.

At S411: the AI distributed client instructs the RAN node device where the AI distributed client is located to execute a related optimization action through an RAN action request message.

At S412: the RAN node device executes the related optimization action in the RAN action request message. If the related optimization action relates to one or more UEs, a base station sends an RRC reconfiguration message or RRC release message to the UE connected to the base station to instruct the UE to execute the related action.

At S413: the RAN node device sends an ML model performance report message carrying an indicator of ML model performance to the AI centralized server.

Optionally, the ML model performance report message carries an ID of the ML session to which the measurement belongs. The AI centralized server determines whether to retrain the deployed network according to the reported model performance report.

In an embodiment of the present application, the AI distributed client is merely used for ML model derivation and execution, and performing model training for network optimization using measurement data in the received measurement report according to the trained machine learning model information in the AI centralized server, to obtain a network optimization action.

As shown in FIG. 5, the operations S501-1 to S506 in FIG. 5 involves substantially the same processing flow as the operations S401-1 to S406 in FIG. 4, and thus are not repeated in the embodiments of the present application. The network optimization processing method of FIG. 5 differs from that of FIG. 4 in that after S506, the network optimization method may include the following operations S507 to S515.

At S507: the AI centralized server selects, according to the measurement data, and the AI computation processing capacity and the supported ML model of the AI distributed client, a suitable ML algorithm, and configures training hyper-parameter values.

At S508: the AI centralized server sends an ML model configuration message to AI distributed clients in one or more RAN node devices to send the selected ML model and ML training hyper-parameters.

Optionally, the ML model configuration message carries an ML session ID configured to uniquely identify an ID of a certain process.

At S509: the RAN node device sends an ML model configuration response message to the AI centralized server.

The ML session setup response message is configured to indicate whether the ML model and the hyper-parameter are successfully configured. Optionally, the ML session setup response message carries an ML session ID.

At S510, if the ML model of an AI distributed client in the RAN node device is successfully configured, the AI distributed client performs ML model training/ML model iterative update according to the designated training model and training hyper-parameters.

At S511: the AI distributed clients in one or more RAN node devices send an ML distributed model training request to the AI centralized server.

The ML distributed model training request is carried in the trained ML model information of the AI distributed client.

At S512: if the trained ML model information is successfully configured, the AI centralized server sends an ML distributed training response message to the AI distributed clients in one or more RAN node devices.

The ML distributed training response message is configured to indicate whether configuration the trained ML model is successful or failed. Optionally, the ML distributed training response message carries an ML session ID.

Next, the processing flow of performing collaborative training between the AI distributed client and the AI centralized server in the network optimization method will be described through a model training processing flow Option A and another model training processing flow Option B.

In Option A, the processing flow of collaborative training may include the following operations A-1 to A-2.

At A-1: the AI centralized server further performs model processing operations such as model update, model training, model inference, model execution and the like according to the measurement data and the ML training parameters reported by the AI distributed client, to obtain an RAN action desired for optimization.

At A-2: the AI centralized server instructs the RAN node to execute a related optimization action through an RAN network optimization action request message.

In Option B, the processing flow of collaborative training may include the following operations B-1 to B-4.

At B-1: the AI centralized server further performs model training and model iterative update according to the measurement data and the trained ML model information reported by the AI distributed client.

At B-2: the AI centralized server sends an ML model deployment message to an AI distributed client in the RAN node device so that the AI distributed client performs model configuration and execution.

At B-3: The AI Distributed Client Sends an ML Model Deployment Response Message.

The model deployment response message is configured to indicate whether configuration of the ML model deployment is successful or failed.

The model deployment message and the ML model deployment response message may each carry an ML session ID.

At B-4: the AI distributed client performs ML model inference or model execution according to a configuration file in the ML model deployment message, and the trained ML model and ML model parameter values, to obtain an RAN action desired for optimization.

At S513: the AI distributed client instructs the RAN node device where the AI distributed client is located to execute a related optimization action.

At S514: the RAN node device executes the related optimization action in the RAN action request message. If the related optimization action relates to one or more terminal devices, the RAN node device sends an RRC reconfiguration message or RRC release message to the terminal device connected to the RAN node device, to instruct the terminal device to execute the related action.

At S515: the RAN node device sends an ML model performance report message to the AI centralized server.

The ML model performance report message may carry an ID of the ML session to which the measurement belongs. The AI centralized server determines whether to retrain the deployed network according to the reported model performance report.

In an embodiment of the present application, the AI distributed client and the AI centralized server perform centralized training, and provide the two distributed model training modes, i.e., Option A and Option B, and the AI distributed client and the AI centralized server perform model training for network optimization using measurement data in the received measurement report to obtain a network optimization action.

Figure 6:
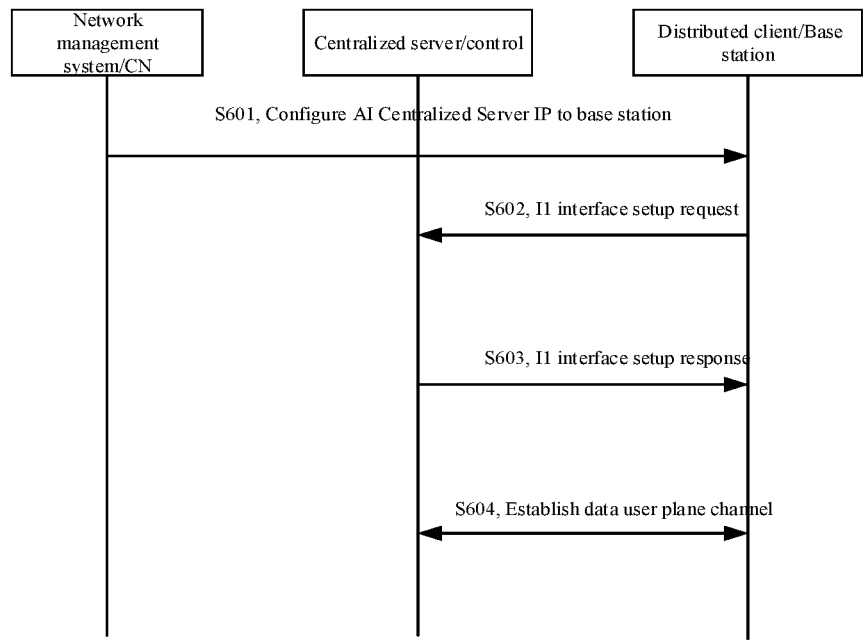
FIG. 6 is a schematic flowchart of establishing a communication interface between a server and a network side device according to an embodiment of the present application.

FIG. 6 is a schematic flowchart of establishing a communication interface between a server and a network side device according to an embodiment. As shown in FIG. 6, in an embodiment, the interface setup process may include the following operations S601 to S604.

At S601, the network management system configures an address of the AI centralized server to the base station directly or through the configuration message.

At S602, the base station sends a communication interface setup request according to the configured address of the AI centralized server.

In this operation, an interface between the AI centralized server and an RAN node is referred to as an I1 interface, and the RAN node sends an I1 interface setup request message to the address of the AI centralized server to establish the I1 interface.

In an embodiment, the communication interface setup request may include: measurement supported by the network side device (e.g., a base station); a measurement reporting mode supported by the network side device; an RAN optimization action supported by the network side device; an AI computing capacity supported by the AI distributed client; and an ML model supported by the AI distributed client.

In an embodiment, the communication interface setup request may further include: a data plane channel address of the network side device.

At S603, the AI centralized server sends an interface setup response message to the base station to indicate whether the interface is established successfully.

In this operation, the interface setup response message may be an Ti interface setup response message configured to indicate whether the interface is established successfully. If the message received in S602 carries the data plane channel address of the base station side, the response message carries the data plane channel address of the AI centralized server.

Through the above operations S601 to S603, a control plane interface of the AI centralized server used for the RAN node may be established. The control plane interface may be configured to transmit control messages, or transmit data, such as measurement data, desired for ML.

At S604, a data plane channel is established according to the data plane channel address configured at the AI centralized server and the data plane channel address of the base station side.

In an embodiment of the present application, data desired for machine learning may be transmitted between the network side device and the AI centralized server over the data plane channels. For example, some data of a great volume, such as measurement data from the base station, or trained parameters like weights and biases of the AI centralized server, may be transmitted over the data plane channels, so as to relieve the data transmission pressure on a communication channel corresponding to the control plane interface and improve the data transmission efficiency. The data plane channel established in this embodiment is not limited to transmitting data of a designated user.

Figure 7:
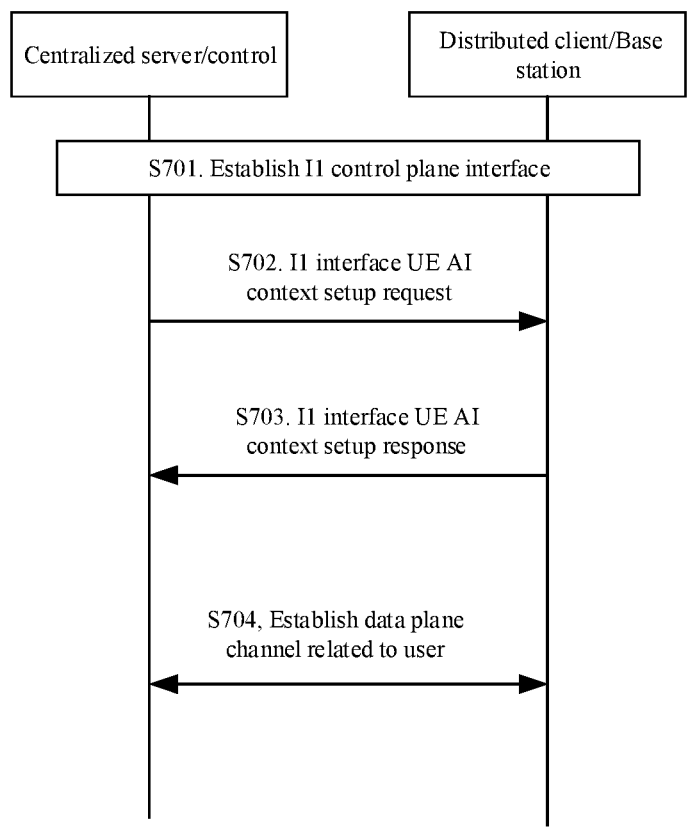
FIG. 7 is a schematic flowchart of establishing a data channel between a predetermined server and a user equipment according to an embodiment of the present application.

FIG. 7 is a schematic flowchart of establishing a data channel between a predetermined server and a user equipment according to an embodiment. In an embodiment, the interface setup process may include the following operations S701 to At S701, an I1 control plane interface established between the AI centralized server and the base station is obtained.

The AI distributed client is deployed in the base station.

At S702, the AI centralized server sends a channel setup request message to the base station.

As an example, the channel setup request message may be, for example, a UE AI context setup request message, and carries a data plane channel address at the AI server side and a UE ID.

At S703, the base station sends a response message carrying a data plane channel address at the base station side to the AI centralized server.

As an example, the channel setup response message may be, for example, a UE AI context setup response message, and carries a data plane channel address at the base station side.

At S704, a data plane channel designated by the UE ID and a data plane channel related to a specific user is established according to the data plane channel address configured at the AI server and the data plane channel address at the base station side.

As an example, data desired for an ML related to a specific user may be transmitted between the base station and the AI server over the data plane channels, and generally, some data of a great volume, such as measurement data of the user, or the trained ML model and parameters based on the user data, may be transmitted over the data plane channels.

In an embodiment of the present application, data desired for machine learning may be transmitted between an RAN node device and an AI server over data plane channels. For example, some data of a great volume, such as measurement data from the base station, may be transmitted over the data plane channels, so as to relieve the data transmission pressure on a communication channel corresponding to the control plane interface and improve the data transmission efficiency. The data plane channel established in this embodiment is not limited to transmitting data of a designated user.

Figure 8:
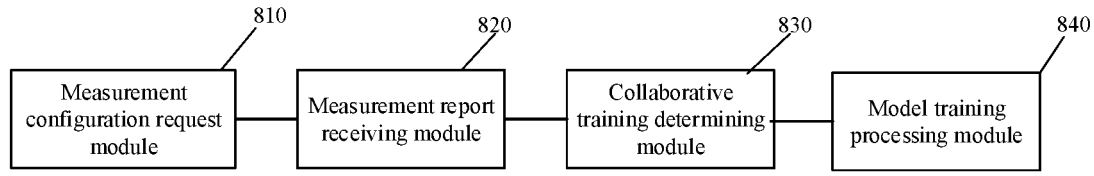
FIG. 8 is a schematic structural diagram of a server according to an embodiment of the present application.

A server according to an embodiment of the present application is described in detail below with reference to the accompanying drawings. FIG. 8 is a schematic structural diagram of a server according to an embodiment of the present application. In an embodiment, the server is an AI centralized server which, as shown in FIG. 8, may include modules.

A measurement configuration request module 810 is configured to send a session setup request message to a client device to request the client device to perform measurement configuration on a designated network side device and perform measurement configuration on a terminal device connected to the designated network side device.

A measurement report receiving module 820 is configured to receive a measurement report message of the designated network side device and a measurement report message of the terminal device.

A collaborative training determining module 830 is configured to determine, according to pre-acquired machine learning description information, whether to perform collaborative training with the client device.

A model training processing module 840 is configured to perform designated model training processing for network optimization based on whether to perform collaborative training with the client device and measurement data in the received measurement report messages, and send a model training processing result to the client device to instruct the client device to obtain a network optimization action according to the model training processing result.

In an embodiment, the server further includes: a first activation module configured to activate a machine learning function in response to receiving a first activation message, and acquire machine learning description information and training hyper-parameters of a corresponding machine learning model carried in the activation message.

In an embodiment, the session setup request message includes measurement control information for the client device, a computation processing capacity information item of the client device, and one or more machine learning models desired to be supported by the client device. The measurement configuration information is configured to indicate a measurement quantity and a measurement reporting mode to be configured for the designated network side device.

In an embodiment, the server further includes: a session setup response module configured to determine, in response to the received session setup response message and according to a succeed ID carried in the session setup response message, that the client device is capable of meeting requirement information on the computation processing capacity of the client device.

In an embodiment, the measurement report receiving module 820 is specifically configured to receive a measurement report of the designated network side device and a measurement report of the terminal device sent from the designated network side device.

In an embodiment, the machine learning description information includes one or more selected machine learning types and one or more selected machine learning models; and the collaborative training determining module 830 includes: a training mode determining unit configured to acquire, according to a selected machine learning type and a selected machine learning model, a predetermined training mode corresponding to the machine learning type and the machine learning model; and a collaborative training unit configured to determine, according to a predetermined training mode, whether to perform collaborative training with the client device.

In an embodiment, when it is determined not to perform collaborative training with the client device, the model training processing result includes the trained machine learning model and model parameter values; and the model training processing module 840 may include: a computation processing capacity acquisition unit configured to acquire the computation processing capacity of the client device from the received measurement report of the designated network side device, where the client device is deployed in the designated network side device; a model training unit configured to select according to the received measurement data, the computation processing capacity of the client device and a pre-acquired machine learning model supported by the client device, a machine learning algorithm for model training to obtain the trained machine learning model and model parameter values; and a model deployment request sending unit configured to send a first model deployment message to the client device to generate a first network optimization action instruction at the client device. The first model deployment message includes: a first model derivation configuration file, the trained machine learning model and model parameter values, a first model performance reporting indication, and a first model performance reporting mode.

In an embodiment, the server further includes: a model deployment response module configured to determine, in response to receiving a first model deployment response message from the client device and according to a first model deployment succeed ID in the first model deployment response message, that the trained machine learning model is successfully deployed at the client device; or determine, according to the first model deployment fail ID in the first model deployment response message, that the trained machine learning model fails to be deployed at the client device.

In an embodiment, the server further includes: a model performance determining module configured to determine, in response to receiving a first model performance report message from the network side device and according to a model performance indicator value carried in the first model performance report message, whether to perform model training processing again.

In an embodiment, when it is determined to perform collaborative training with the client device, the model training processing module 840 includes: a computation processing capacity acquisition unit configured to acquire the computation processing capacity reported by the client device from the received measurement report of the designated network side device; where the client device is deployed in the designated network side device; a model and parameter selection unit configured to select a machine learning algorithm and configure training hyper-parameter values according to the received measurement data, the pre-acquired computation processing capacity of the client device, and a machine learning model supported by the client device; a model configuration message sending unit configured to send a model configuration message to the client device to request the client device to perform model configuration according to the machine learning algorithm and the training hyper-parameter values; and a distributed training request receiving module configured to receive a model configuration message from the client device. The model configuration message includes trained machine learning model information obtained through model configuration and model training for the machine learning algorithm and the training hyper-parameter values by the client device. The model performance determining module is further configured to perform model configuration and model training processing based on the trained machine learning model information to obtain the model training processing result, and send the model training processing result to the client device.

In an embodiment, the model training processing result includes a second network optimization action instruction; and the model performance determining module further includes: an action instruction generating unit configured to further perform model training according to the received measurement data and the trained machine learning model information to obtain a second network optimization action instruction; and an action request sending unit configured to send a second network operation request message to the network side device. The second network operation request message includes a second network optimization action instruction, a second model performance reporting indication, and a second model performance reporting mode.

In an embodiment, the model performance determining module further configured to determine, in response to receiving a second model performance report message from the network side device and according to a model performance indicator value carried in the second model performance report message, whether to perform model training processing again.

In an embodiment, the model training processing result includes the further trained machine learning model and model parameter values; and performing model configuration and model training processing based on the machine learning model information to obtain a model training processing result, and sending the model training processing result to the client device includes:

further perform model training according to the received measurement data and the machine learning model information to obtain the further trained machine learning model and model parameter values; and sending a second model deployment message to the client device to generate a third network optimization action instruction at the client device. The second model deployment message includes: a second model derivation configuration file, the further trained machine learning model and model parameter values, a second model performance reporting indication, and a second model performance reporting mode.

In an embodiment, the server further includes: a model deployment response module configured to determine, in response to receiving a second model deployment response message from the client device and according to a second model deployment succeed ID carried in the second model deployment response message, that the further trained machine learning model is successfully deployed at the client device; or determine, according to the second model deployment fail ID carried in the second model deployment response message, that the further trained machine learning model fails to be deployed at the client device.

In an embodiment, the server further includes: a model performance determining module configured to determine, in response to receiving a second model performance report message from the network side device and according to a model performance indicator value carried in the second model performance report message, whether to perform model training processing again.

In an embodiment, a current server communicates with the designated network side device and the client device located in the designated network side device through a predetermined interface. The server further includes: a predetermined interface setup module configured to establish, in response to the received control plane interface setup request message, a control plane interface between the current server and the designated network side device as the predetermined interface; and send a control plane interface setup response message to the designated network side device to indicate that the predetermined interface is successfully established.

In an embodiment, if the control plane interface setup request message includes data plane channel information of the designated network side device, a data plane channel address of the current server is carried in the control plane interface setup response message while sending the control plane interface setup response message to the designated network side device.

According to the server in the embodiments of the present application, the client device is requested to perform measurement configuration on the network side device and the terminal side device, and according to pre-acquired machine learning description information, it is judged whether to perform collaborative training with the client device, and different kinds of model training processing are performed according to the judgment result. Therefore, a machine learning training process is deployed through the server and the client device to implement distributed model training and processing and to obtain a network optimization action, so that deep analysis is performed on the collected data through artificial intelligence and machine learning in the network system, and a new optimization mode and a new network intelligence optimization flow are provided for network optimization of operators.

Figure 9:
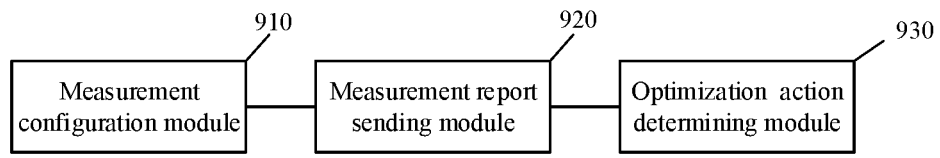
FIG. 9 is a schematic structural diagram of a client device according to an embodiment of the present application.

FIG. 9 is a schematic structural diagram of a client device according to an embodiment of the present application. In an embodiment, the client device is an AI distributed client deployed in a network side node device, such as a base station. As shown in FIG. 9, the client device may include the following modules.

A measurement configuration module 910 is configured to perform, in response to receiving a session setup request message from a predetermined server, measurement configuration on a designated network side device and a terminal device connected to the designated network side device according to measurement control information contained in the session setup request message.

A measurement report sending module 920 is configured to send a measurement report message of the designated network side device and a measurement report message of the terminal device to the predetermined server. The measurement report of the designated network side device and the measurement report of the terminal device are used in model training processing for network optimization in the predetermined server.

An optimization action determining module 930 is configured to process, in response to receiving a model training processing result from the predetermined server, according to the model training processing result to obtain a network optimization action.

In an embodiment, the measurement configuration module 910 may be specifically configured to perform, in response to the session setup request message, measurement configuration on a network side device where a current client device is located according to network side measurement control information; and send a measurement configuration request to a network side device not deployed with the current client device to request the network side device not deployed with the current client device to perform measurement configuration according to the network side measurement control information.

In an embodiment, the session setup request message further includes one or more machine learning models desired to be supported by the client device; and the client device further includes: a session setup response module configured to send, if the measurement configuration of the network side device and the terminal device is successful and the current client device supports the machine learning model, a session setup response message carrying a configuration succeed ID to the predetermined server; and send, if the measurement configuration of the network side device or the terminal device fails, or the current client device does not support the machine learning model, a session setup response message carrying a configuration fail ID to the predetermined server.

In an embodiment, the session setup request message further includes a computation processing capacity information item; and the measurement report sending module 920 is further configured to carry a computation processing capacity of the current client device in the measurement report of the network side device where the current client device is located while sending a measurement report message of the designated network side device and a measurement report message of the terminal device to the predetermined server.

In an embodiment, the client device further includes: an activation module configured to activate a machine learning function in response to receiving a second activation message, and acquire machine learning description information and policy information to be satisfied by the network, carried in the second activation message.

In an embodiment, the model training processing result is a trained machine learning model; and the optimization action determining module 930 includes: a model deployment module configured to deploy and execute, in response to receiving a first model deployment message from the predetermined server and according to a model derivation configuration file, the trained machine learning model and model parameter values in the first model deployment message, the trained machine learning model to obtain a first network optimization action instruction.

In an embodiment, the client device further includes: a model deployment response module configured to send, if the trained machine learning model is successfully deployed, a first model deployment response message carrying a first model deployment succeed ID to the predetermined server; and send, if the trained machine learning model fails to be deployed, a first model deployment response message carrying a first model deployment fail ID to the predetermined server.

In an embodiment, the model deployment message further includes a first model performance reporting indication, and a first model performance reporting mode, and the client device further includes: an action instruction execution module configured to execute the first network optimization action instruction at a network side device where a current client device is located; an action request module configured to generate a first network optimization action request to request a network side device not deployed with the current client device to designate the first network optimization action instruction; and a performance reporting module configured to send, according to the first model performance reporting mode, a first model performance report message to the predetermined server. A corresponding model performance indicator value is carried in the first model performance report message.

In an embodiment, the optimization action determining module 930 includes: a model deployment module configured to perform, in response to receiving a model configuration message from the predetermined server, model configuration and hyper-parameter configuration according to a machine learning algorithm and training hyper-parameter values in the model configuration message; a model training module configured to perform, if model configuration and hyper-parameter configuration are successful, machine learning model training according to the configured model and hyper-parameters to obtain trained machine learning model information; a distributed training request module configured to send a distributed training request message to the predetermined server. The distributed training request message contains the trained machine learning model information. The optimization action determining module 930 is further configured to obtain, in response to receiving a model training processing result for the trained machine learning model information from the predetermined server, a network optimization action according to the model training processing result.

In an embodiment, the model training processing result includes a second network optimization action instruction; and the optimization action determining module 930 is further configured to obtain, in response to receiving a second network optimization action request from the predetermined server, the second network optimization action instruction carried in the second network optimization action request.

In an embodiment, the second network optimization action request further includes a second model performance reporting indication, and a second model performance reporting mode. The action instruction execution module is further configured to execute the second network optimization action instruction at a network side device where a current client device is located; the action request module is further configured to generate a second network operation request message to request a network side device not deployed with the current client device to designate the second network optimization action instruction; and the performance reporting module is further configured to send, according to the second model performance reporting mode, a second model performance report message to the predetermined server. A second model performance indicator value is carried in the second model performance report message.

In an embodiment, the model training processing result includes the further trained machine learning model and model parameter values; and the optimization action determining module 930 is further configured to deploy and execute, in response to receiving a second model deployment message and according to a model derivation configuration file, the further trained machine learning model and model parameter values in the second model deployment message, the further trained machine learning model to obtain a third network optimization action instruction.

In an embodiment, the model deployment response module is further configured to send, if the further trained machine learning model is successfully deployed, a second model deployment response message carrying a second model deployment succeed ID to the predetermined server; and send, if the further trained machine learning model fails to be deployed, a second model deployment response message carrying a second model deployment fail ID to the predetermined server.

In an embodiment, the second model deployment message further includes a second model performance reporting indication, and a second model performance reporting mode. The action instruction execution module is further configured to execute the third network optimization action instruction at a network side device where a current client device is located; the action request module is further configured to generate a third network optimization action request to request a network side device not deployed with the current client device to execute the third network optimization action instruction; and the action request module is further configured to send, according to the second model performance reporting mode, a second model performance report message to the predetermined server. A corresponding model performance indicator value is carried in the second model performance report message.

According to the client device in the embodiments of the present application, measurement configuration is performed on the network side device and the terminal side device in response to the session setup request message from the server, and processing is performed in response to the model training processing result from the predetermined server to obtain the network optimization action, and distributed model training processing is implemented with the server based on the model training processing result transmitted with the server to finally obtain the network optimization action. Therefore, data collected by the network side device and the terminal device can be deeply analyzed in machine learning, and a new optimization mode and a new network intelligence optimization flow are provided through the distributed model training for network optimization of operators.

Figure 10:
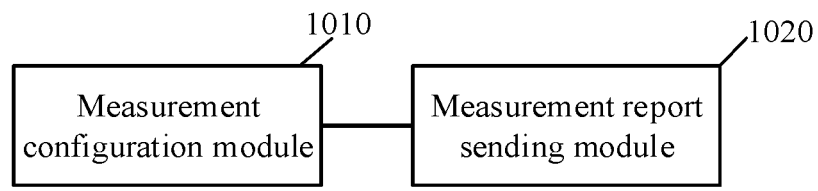
FIG. 10 is a schematic structural diagram of a network side device according to an embodiment of the present application.

FIG. 10 is a schematic structural diagram of a network side device according to an embodiment of the present application. In an embodiment, the network side device is a RAN node device. As shown in FIG. 10, the network side node device may include the following modules.

A measurement configuration module 1010 is configured to perform, in response to receiving a measurement configuration request from a client device, measurement configuration according to network side measurement control information in the measurement configuration request, and perform measurement configuration on a terminal device connected to a current network side device.

A measurement report sending module 1020 is configured to send a measurement report the current network side device obtained from measurement and a received measurement report of the terminal device to a predetermined server and a predetermined client device, respectively. The measurement report of the current network side device and the measurement report of the terminal device are used in the predetermined server and the predetermined client device for model training processing aiming at network optimization.

In an embodiment, the measurement configuration module 1010 is further configured to perform, in response to receiving the measurement configuration request, measurement configuration according to the network side measurement control information; determine, according to the network side measurement control information, a measurement quantity and a measurement reporting mode to be configured for the terminal device connected to the current network side device as terminal side measurement control information;

and send a radio resource control message to the terminal device to instruct the terminal device to perform measurement configuration according to the terminal side measurement control information.

In an embodiment, the network side device further includes: a performance report sending module configured to receive a network optimization action request from the predetermined server or the client device, acquire and execute a network optimization action instruction in the received network optimization action request, and send a corresponding model performance report message to the predetermined server.

In an embodiment, the designated network side communicates with the predetermined server through a predetermined interface, and the network side device further includes: an interface setup request module configured to send, according to a pre-acquired address of the predetermined server, a control plane interface setup request message to the predetermined server to request the predetermined server to establish a control plane interface between the current network side device and the predetermined server as the predetermined interface.

In an embodiment, the control plane interface setup request message includes one or more of: measurement supported by the current network side device, a reporting mode supported by the current network side device, a network optimization action supported by the current network side device and a data plane channel address of the current network side device, a computing capacity supported by the deployed client device and a machine learning model supported by the deployed client device.

In an embodiment, the interface setup request module is further configured to determine, in response to the received control plane interface setup response message, that a control plane interface is successfully established between the current network side device and the predetermined server. If the control plane interface setup request message includes the data plane channel address of the current network side device, the received control plane interface setup response message includes the data plane channel address of the predetermined server.

According to the network side device in the embodiments of the present application, measurement configuration can be performed according to the received network side measurement control information and on the connected terminal device, and the measurement report obtained from the measurement and the received measurement report the terminal side device can be sent to the predetermined server and client device, and the measurement report of the network side device and the measurement report of the terminal device are used in the predetermined server and the predetermined client device for model training processing aiming at network optimization. Therefore, data collected by the network side device and the terminal device can be deeply analyzed in artificial intelligence and machine learning, and used in the predetermined server and the predetermined client device for distributed model training processing to provide a new optimization mode and a new network intelligence optimization flow for network optimization of operators.

Figure 11:
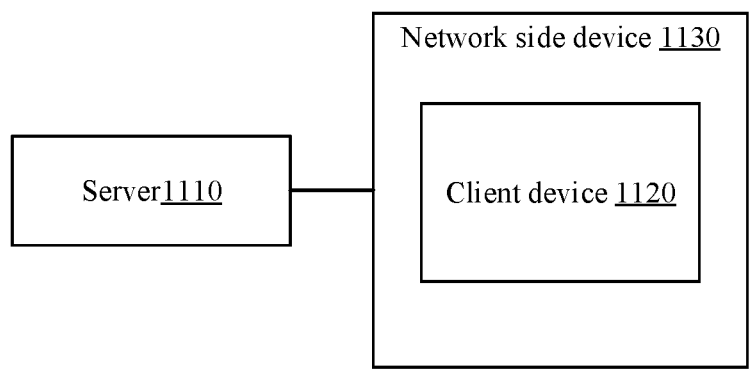
FIG. 11 is a schematic structural diagram of a network optimization system according to an embodiment of the present application.

FIG. 11 is a schematic structural diagram of a network optimization system according to an embodiment of the present application. In an embodiment, the network side device is a RAN node device. As shown in FIG. 11, the network optimization system may include a server 1110, one or more client devices 1120, and one or more network side devices 1130. Each client device is located in one of the one or more network side devices.

The server 1110 is configured to implement the network optimization method according to any embodiment of the present application. The one or more client devices 1120 are configured to implement the network optimization method according to any embodiment of the present application. The one or more network side devices 1130 are configured to implement the network optimization method according to any embodiment of the present application.

In this embodiment, the server 1110 has a same or equivalent structure as the AI centralized server described in the above embodiments, and can implement the network optimization method applied to the AI centralized server described in the above embodiments. Each of the client devices 1120 has a same or equivalent structure as the AI distributed client described in the above embodiments, and can implement the network optimization method applied to the network side device described in the above embodiments. Each of the network side devices 1130 has a same or equivalent structure as the RAN node device described in the above embodiments, and can implement the network optimization method applied to the RAN node device described in the above embodiments.

It should be noted that the present application is not limited to the particular configurations and processes described in the above embodiments and illustrated in the drawings. For convenience and simplicity of description, detailed description of a known method is omitted here, and for the specific working processes of the system, the module and the unit described above, reference may be made to corresponding processes in the foregoing method embodiments, which are not repeated here.

Figure 12:
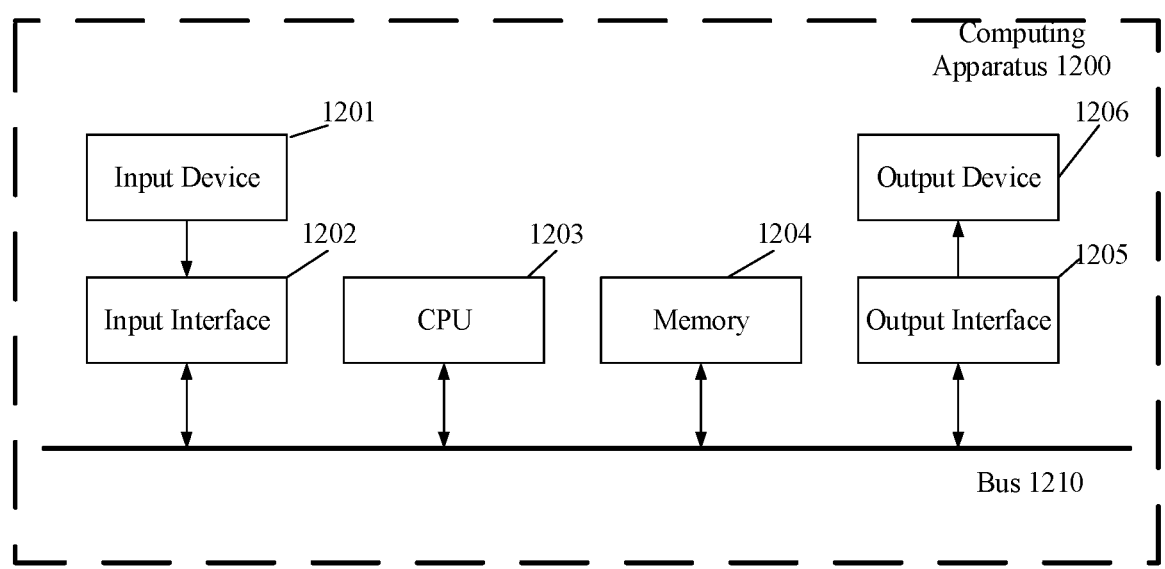
FIG. 12 is a block diagram of an exemplary hardware architecture capable of implementing a computing apparatus according to an embodiment of the present application.

FIG. 12 is a block diagram of an exemplary hardware architecture capable of implementing a computing apparatus according to an embodiment of the present application.

As shown in FIG. 12, a computing apparatus 1200 includes an input device 1201, an input interface 1202, a central processing unit 1203, a memory 1204, an output interface 1205, and an output device 1206. The input interface 1202, the central processing unit 1203, the memory 1204, and the output interface 1205 are interconnected via a bus 1210, and the input device 1201 and the output device 1206 are connected to the bus 1210 via the input interface 1202 and the output interface 1205, respectively, and thus to other components of the computing apparatus 1200.

Specifically, the input device 1201 receives input information from the outside, and transmits the input information to the central processing unit 1203 via the input interface 1202; the central processing unit 1203 processes input information based on computer-executable instructions stored in the memory 1204 to generate output information, stores the output information temporarily or permanently in the memory 1204, and then transmits the output information to the output device 1206 via the output interface 1205; and the output device 1206 outputs the output information to the outside of the computing apparatus 1200 for use by a user.

In an embodiment, the computing apparatus shown in FIG. 12 may be implemented as a server, including: a memory configured to store a program; and a processor configured to execute the program stored in the memory to implement the network optimization method applied to the AI centralized server described in the above embodiments.

In an embodiment, the computing apparatus shown in FIG. 12 may be implemented as a client device, including: a memory configured to store a program; and a processor configured to execute the program stored in the memory to implement the network optimization method applied to the AI distributed client described in the above embodiments.

In an embodiment, the computing apparatus shown in FIG. 12 may be implemented as a network side device, including: a memory configured to store a program; and a processor configured to execute the program stored in the memory to implement the network optimization method applied to the network side device described in the above embodiments.

The above are merely exemplary embodiments of the present application and not intended to limit the scope of the present application. In general, the various embodiments of the present application may be implemented in hardware or dedicated circuits, software, logic or any combination thereof. For example, some aspects may be implemented in hardware, while other aspects may be implemented in firmware or software which may be executed by a controller, microprocessor or other computing device, although the present application is not limited thereto.

Embodiments of the present application may be implemented by a data processor of a mobile device executing computer program instructions, for example in a processor entity, or by hardware, or by a combination of software and hardware. The computer program instructions may be assembler instructions, instruction set architecture (ISA) instructions, machine instructions, machine-related instructions, microcode, firmware instructions, state setting data, or source code or object code written in any combination of one or more programming languages.

The block diagrams of any logic flow in the figures of the present application may represent program operations, or may represent interconnected logic circuits, modules, and functions, or may represent a combination of program operations and logic circuits, modules, and functions. The computer program may be stored on a memory. The memory may be of any type suitable to the local technical environment and may be implemented using any suitable data storage technology, such as but not limited to, read-only memories (ROMs), random access memories (RAMs), optical storage devices or systems (digital video disks (DVDs), compact discs (CDs)), etc. The computer-readable medium may include a nontransitory storage medium. The data processor may be of any type suitable to the local technical environment, such as but not limited to, general purpose computers, dedicated computers, microprocessors, digital signal processors (DSPs), application specific integrated circuits (ASICs), field-programmable gate arrays (FGPAs), and processors based on multi-core processor architecture.

What is claimed is:

1. A network optimization method, comprising:
sending a session setup request message to a client device to request the client device to perform measurement configuration on a designated network side device and perform measurement configuration on a terminal device connected to the designated network side device;
receiving a measurement report message of the designated network side device and a measurement report message of the terminal device;
determining, according to pre-acquired machine learning description information, whether to perform collaborative training with the client device; and
performing designated model training processing for network optimization based on whether to perform collaborative training with the client device and measurement data in the received measurement report messages, and sending a model training processing result to the client device to instruct the client device to obtain a network optimization action according to the model training processing result.

2. The method according to claim 1, wherein one of the following is satisfied:
prior to sending the session setup request message to the client device, the method further comprises: activating a machine learning function in response to receiving a first activation message, and acquiring machine learning description information and training hyper-parameters of a corresponding machine learning model carried in the first activation message;
receiving the measurement report message of the designated network side device and the measurement report message of the terminal device comprises: receiving a measurement report of the designated network side device, and a measurement report of the terminal device sent from the designated network side device;
the machine learning description information comprises one or more selected machine learning types and one or more selected machine learning models; and determining, according to pre-acquired machine learning description information, whether to perform collaborative training with the client device comprises: acquiring, according to a selected machine learning type and a selected machine learning model, a predetermined training mode corresponding to the machine learning type and the machine learning model; and determining, according to the predetermined training mode corresponding to the machine learning type and the machine learning model, whether to perform collaborative training with the client device; or
after sending the second model deployment message to the client device, the method further comprises: determining, in response to receiving a second model performance report message from the network side device and according to a model performance indicator value carried in the second model performance report message, whether to perform model training processing again.

3. The method according to claim 1, wherein
the session setup request message comprises measurement control information for the client device, a computation processing capacity information item of the client device, and one or more machine learning models desired to be supported by the client device, wherein the measurement control information is configured to indicate a measurement quantity and a measurement reporting mode to be configured for the designated network side device.

4. The method according to claim 3, wherein after sending the session setup request message to the client device, the method further comprises:
determining, in response to the received session setup response message and according to a succeed ID carried in the session setup response message, that the client device is capable of meeting requirement information on the computation processing capacity of the client device.

5. The method according to claim 1, wherein in the case where it is determined not to perform collaborative training with the client device, the model training processing result comprises the trained machine learning model and model parameter values; and performing designated model training processing for network optimization based on whether to perform collaborative training with the client device and measurement data in the received measurement report messages, and sending the model training processing result to the client device comprises:

acquiring the computation processing capacity of the client device from the received measurement report of the designated network side device, wherein the client device is deployed in the designated network side device;

selecting, according to the received measurement data, the computation processing capacity of the client device and a pre-acquired machine learning model supported by the client device, a machine learning algorithm to perform model training to obtain the trained machine learning model and model parameter values; and sending a first model deployment message to the client device to generate a first network optimization action instruction at the client device, wherein the first model deployment message comprises: a first model derivation configuration file, the trained machine learning model and model parameter values, a first model performance reporting indication, and a first model performance reporting mode.

6. The method according to claim 5, wherein after sending the first model deployment message to the client device, the method further comprises:

determining, in response to receiving a first model deployment response message from the client device and according to a first model deployment succeed ID in the first model deployment response message, that the trained machine learning model is successfully deployed at the client device;

determining, according to a first model deployment fail ID in the first model deployment response message, that the trained machine learning model fails to be deployed at the client device; or, determining, in response to receiving a first model performance report message from the network side device and according to a model performance indicator value carried in the first model performance report message, whether to perform model training processing again.

7. The method according to claim 1, wherein in the case where it is determined to perform collaborative training with the client device, performing designated model training processing for network optimization based on whether to perform collaborative training with the client device and measurement data in the received measurement report messages and sending the model training processing result to the client device comprises:

acquiring a computation processing capacity of the client device from the received measurement report of the designated network side device, wherein the client device is deployed in the designated network side device;

selecting a machine learning algorithm and configuring training hyper-parameter values according to the received measurement data, the pre-acquired computation processing capacity of the client device, and a machine learning model supported by the client device;

sending a model configuration message to the client device to request the client device to perform model configuration according to the machine learning algorithm and the training hyper-parameter values;

receiving a distributed training request message from the client device, wherein the distributed training request message comprises trained machine learning model information obtained through model configuration and model training for the machine learning algorithm and the training hyper-parameter values by the client device; and performing model configuration and model training processing based on the trained machine learning model information to obtain a model training processing result, and sending the model training processing result to the client device.

8. The method according to claim 7, wherein the model training processing result comprises a second network optimization action instruction; and performing model configuration and model training processing based on the trained machine learning model information to obtain the model training processing result, and sending the model training processing result to the client device comprises:

further performing model training according to the received measurement data and the trained machine learning model information to obtain the second network optimization action instruction; and sending a second network operation request message to the network side device, wherein the second network operation request message comprises the second network optimization action instruction, a second model performance reporting indication, and a second model performance reporting mode.

9. The method according to claim 7, wherein the model training processing result comprises the further trained machine learning model and model parameter values; and performing model configuration and model training processing based on the trained machine learning model information to obtain the model training processing result, and sending the model training processing result to the client device comprises:

further performing model training according to the received measurement data and the machine learning model information to obtain the further trained machine learning model and model parameter values; and sending a second model deployment message to the client device to generate a third network optimization action instruction at the client device, wherein the second model deployment message comprises: a second model derivation configuration file, the further trained machine learning model and model parameter values, a second model performance reporting indication, and a second model performance reporting mode.

10. The method according to claim 1, wherein a current server communicates with the designated network side device and the client device located in the designated network side device through a predetermined interface; prior to sending the session setup request message to the client device, the method further comprises:

establishing, in response to the received control plane interface setup request message, a control plane interface between the current server and the designated network side device as the predetermined interface; and sending a control plane interface setup response message to the designated network side device to indicate that the predetermined interface is successfully established.

11. A network optimization method, comprising:

performing, in response to receiving a session setup request message from a predetermined server, measurement configuration on a designated network side device and a terminal device connected to the designated network side device according to measurement control information contained in the session setup request message;

sending a measurement report message of the designated network side device and a measurement report message of the terminal device to the predetermined server, wherein the measurement report of the designated network side device and the measurement report of the terminal device are used in model training processing for network optimization in the predetermined server; and processing, in response to receiving a model training processing result from the predetermined server, according to the model training processing result to obtain a network optimization action.

12. The method according to claim 11, wherein one of the following is satisfied:

performing, in response to receiving the session setup request message from the predetermined server, measurement configuration on the designated network side device and the terminal device connected to the designated network side device according to measurement control information contained in the session setup request message comprises: performing, in response to the session setup request message, measurement configuration on a network side device where a current client device is located according to network side measurement control information; and sending a measurement configuration request to a network side device not deployed with the current client device to request the network side device not deployed with the current client device to perform measurement configuration according to the network side measurement control information;

the session setup request message further comprises one or more machine learning models desired to be supported by the client device; and after performing measurement configuration on the designated network side device and the terminal device connected to the designated network side device, the method further comprises: sending, in the case where the measurement configuration of the network side device and the terminal device is successful and the current client device supports the machine learning model, a session setup response message carrying a configuration succeed ID to the predetermined server; and sending, in the case where the measurement configuration of the network side device or the terminal device fails, or the current client device does not support the machine learning model, a session setup response message carrying a configuration fail ID to the predetermined server;

the session setup request message further comprises a computation processing capacity information item; and when sending the measurement report message of the designated network side device and the measurement report message of the terminal device to the predetermined server, the method further comprises: carrying, in a measurement report of a network side device where a current client device is located, a computation processing capacity of the current client device; or, before performing, in response to receiving the session setup request message from the predetermined server, measurement configuration on the designated network side device and the terminal device connected to the designated network side device according to measurement control information contained in the session setup request message, the method further comprises: activating a machine learning function in response to receiving a second activation message, and acquiring machine learning description information and policy information to be satisfied by the network, carried in the second activation message.

13. The method according to claim 11, wherein the model training processing result is a trained machine learning model; and processing, in response to receiving the model training processing result from the predetermined server, according to the model training processing result to obtain the network optimization action comprises:

deploying and executing, in response to receiving a first model deployment message from the predetermined server and according to a model derivation configuration file, the trained machine learning model and model parameter values in the first model deployment message, the trained machine learning model to obtain a first network optimization action instruction.

14. The method according to claim 13, wherein after deploying the trained machine learning model, the method further comprises: sending, in the case where the trained machine learning model is successfully deployed, a first model deployment response message carrying a first model deployment succeed ID to the predetermined server; and sending, in the case where the trained machine learning model fails to be deployed, a first model deployment response message carrying a first model deployment fail ID to the predetermined server; or, the first model deployment message further comprises a first model performance reporting indication, and a first model performance reporting mode, and after executing the trained machine learning model to obtain the first network optimization action instruction, the method further comprises: executing the first network optimization action instruction at a network side device where a current client device is located; generating a first network optimization action request to request a network side device not deployed with the current client device to designate the first network optimization action instruction; and sending, according to the first model performance reporting mode, a first model performance report message to the predetermined server, wherein a corresponding model performance indicator value is carried in the first model performance report message.

15. The method according to claim 11, wherein processing, in response to receiving the model training processing result from the predetermined server, according to the model training processing result to obtain the network optimization action comprises:

performing, in response to receiving a model configuration message from the predetermined server, model configuration and hyper-parameter configuration according to a machine learning algorithm and training hyper-parameter values in the model configuration message;

performing, in the case of successful model configuration and hyper-parameter configuration, machine learning model training according to the configured model and hyper-parameters to obtain trained machine learning model information;

sending a distributed training request message to the predetermined server, wherein the distributed training request message contains the trained machine learning model information; and obtaining, in response to receiving a model training processing result for the trained machine learning model information from the predetermined server, a network optimization action according to the model training processing result.

16. The method according to claim 15, wherein
the model training processing result comprises a second network optimization action instruction; and obtaining, in response to receiving the model training processing result for the trained machine learning model information from the predetermined server, the network optimization action according to the model training processing result comprises: obtaining, in response to receiving a second network optimization action request from the predetermined server, the second network optimization action instruction carried in the second network optimization action request; or,
the model training processing result comprises the further trained machine learning model and model parameter values; and obtaining, in response to receiving the model training processing result for the trained machine learning model information from the predetermined server, the network optimization action according to the model training processing result comprises: deploying and executing, in response to receiving a second model deployment message and according to a model derivation configuration file, the further trained machine learning model and model parameter values in the second model deployment message, the further trained machine learning model to obtain a third network optimization action instruction.

17. A network optimization method, comprising:
performing, in response to receiving a measurement configuration request from a client device, measurement configuration according to network side measurement control information in the measurement configuration request, and performing measurement configuration on a terminal device connected to a current network side device; and
sending a measurement report of the current network side device obtained from measurement and a received measurement report of the terminal device to a predetermined server and a predetermined client device, respectively, wherein the measurement report of the current network side device and the measurement report of the terminal device are used in the predetermined server and the predetermined client device for model training processing aiming at network optimization.

18. The method according to claim 17, wherein
performing, in response to receiving the measurement configuration request from the client device, measurement configuration according to network side measurement control information in the measurement configuration request, and performing measurement configuration on the terminal device connected to the current network side device comprises: performing, in response to receiving the measurement configuration request, measurement configuration according to the network side measurement control information; determining, according to the network side measurement control information, a measurement quantity and a measurement reporting mode to be configured for the terminal device connected to the current network side device as terminal side measurement control information; and sending a radio resource control message to the terminal device to instruct the terminal device to perform measurement configuration according to the terminal side measurement control information; or,
after sending the measurement report of the current network side device obtained from measurement and the received measurement report of the terminal device to the predetermined server and the predetermined client device, respectively, the method further comprises: receiving a network optimization action request from the predetermined server or the predetermined client device, acquiring and executing a network optimization action instruction in the received network optimization action request, and sending a corresponding model performance report message to the predetermined server.

19. The network optimization method according to claim 17, wherein the network side device communicates with the predetermined server through a predetermined interface, and before performing, in response to receiving the measurement configuration request from the client device, measurement configuration according to network side measurement control information in the measurement configuration request, and performing measurement configuration on the terminal device connected to the current network side device, the method further comprises:
sending, according to a pre-acquired address of the predetermined server, a control plane interface setup request message to the predetermined server to request the predetermined server to establish a control plane interface between the current network side device and the predetermined server as the predetermined interface.

20. The network optimization method according to claim 19, wherein
the control plane interface setup request message comprises one or more of: measurement supported by the current network side device, a reporting mode supported by the current network side device, a network optimization action supported by the current network side device and a data plane channel address of the current network side device, a computation processing capacity supported by the deployed client device and a machine learning model supported by the deployed client device; or,
the method further comprises: determining, in response to the received control plane interface setup response message, that a control plane interface is successfully established between the current network side device and the predetermined server; wherein in the case where the control plane interface setup request message comprises the data plane channel address of the current network side device, the received control plane interface setup response message comprises the data plane channel address of the predetermined server.

* * * * *